US011303827B2

(12) United States Patent
Siddique et al.

(10) Patent No.: US 11,303,827 B2
(45) Date of Patent: Apr. 12, 2022

(54) OPTICAL DEVICE FOR A THERMAL SENSOR AND A HYBRID THERMAL SENSOR

(71) Applicant: Samsung Electronics Co., Ltd., Suwon-si (KR)

(72) Inventors: Radwanul Hasan Siddique, Pasadena, CA (US); Yibing Michelle Wang, Temple City, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/906,917

(22) Filed: Jun. 19, 2020

(65) Prior Publication Data

US 2021/0337140 A1 Oct. 28, 2021

Related U.S. Application Data

(60) Provisional application No. 63/016,188, filed on Apr. 27, 2020.

(51) Int. Cl.
*H04N 5/33* (2006.01)
*G01J 5/0803* (2022.01)
*G01J 5/00* (2022.01)

(52) U.S. Cl.
CPC .............. *H04N 5/33* (2013.01); *G01J 5/0803* (2013.01); *G01J 2005/0077* (2013.01)

(58) Field of Classification Search
CPC ...................................................... H04N 5/33
See application file for complete search history.

(56) References Cited

U.S. PATENT DOCUMENTS

| 6,278,231 | B1 * | 8/2001 | Iwasaki | H01J 9/025 313/310 |
|---|---|---|---|---|
| 10,126,466 | B2 | 11/2018 | Lin et al. | |
| 10,267,956 | B2 | 4/2019 | Arbabi et al. | |
| 10,355,450 | B2 | 7/2019 | Zhang et al. | |
| 10,437,012 | B1 | 10/2019 | Gurin | |

(Continued)

FOREIGN PATENT DOCUMENTS

| CN | 107315206 B | 3/2019 |
|---|---|---|
| EP | 3428118 A1 | 1/2019 |
| EP | 3499573 A1 | 6/2019 |

(Continued)

OTHER PUBLICATIONS

Adomanis, Bryan M., et al., "Sensitivities of Large-Aperture Plasmonic Metasurface Flat Lenses in the Long-Wave Infrared," Proceedings of SPIE, vol. 10542, 2018, 10 pages.

(Continued)

*Primary Examiner* — Md N Haque
(74) *Attorney, Agent, or Firm* — Lewis Roca Rothgerber Christie LLP

(57) ABSTRACT

An imaging device includes: a sensor to detect a first target spectrum, the first target spectrum corresponding to a thermal imaging region of an infrared (IR) spectrum; and an optical device to transmit external light to the sensor, the optical device including: a substrate; and a plurality of nanostructures on the substrate, and to collimate at least the first target spectrum in the external light on the sensor. The plurality of nanostructures are spaced apart from each other, and at least one of the plurality of nanostructures has a different geometric size from that of another.

15 Claims, 15 Drawing Sheets

(56) References Cited

U.S. PATENT DOCUMENTS

| | | | |
|---|---|---|---|
| 2006/0023314 A1 | 2/2006 | Boettiger et al. | |
| 2013/0229704 A1 | 9/2013 | Smolyaninov | |
| 2016/0306079 A1 | 10/2016 | Arbabi et al. | |
| 2017/0050555 A1* | 2/2017 | Chen | F21S 41/675 |
| 2017/0146806 A1 | 5/2017 | Lin et al. | |
| 2019/0025482 A1* | 1/2019 | Lee | G02B 5/201 |
| 2019/0041660 A1 | 2/2019 | Ahmed | |
| 2019/0271799 A1* | 9/2019 | Sosnowski | G02B 1/11 |
| 2019/0353522 A1* | 11/2019 | Scholtz | G01J 3/0208 |
| 2020/0166783 A1* | 5/2020 | Roy | B82Y 20/00 |

FOREIGN PATENT DOCUMENTS

| | | |
|---|---|---|
| WO | WO 2018/118984 A1 | 6/2018 |
| WO | 2018/142339 A1 | 8/2018 |
| WO | WO 2019/148200 A1 | 8/2019 |

OTHER PUBLICATIONS

Arbabi, Amir, et al, "Efficient dielectric metasurface collimating lenses for mid-infrared quantum cascade lasers," OSA Publishing, Optics Express, vol. 23, No. 26, 2015, 8 pages.

Li, Bo, et al., "Metalens-Based Miniaturized Optical Systems," Micromachines, vol. 10, 2019, 21 pages.

Meem, Monjurul, et al., "Broadband lightweight flat lenses for long-wave infrared imaging," PNAS, vol. 116, No. 43, Oct. 2019, 4 pages.

Meem, Monjurul, et al., "Imaging from the Visible to the Longwave Infrared wavelengths via an inverse-designed flat lens," arXiv: Physics: Optics, Jan. 2020, 35 pages.

\* cited by examiner

| Material | Wavelength | Refractive index (@0.8um) | Transmission (@0.8um) |
|---|---|---|---|
| Barium Fluoride (BaF2) | 0.15-12.5 um | 1.4258 | 97% |
| Potassium Bromide (KBr) | 0.21-28 um | 1.53 | 96% |
| Potassium Chloride (KCl) | 0.21-21 um | 1.4829 | 96% |
| Calcium Fluoride (CaF2) | 0.15-9.0 um | 1.4305 | 97% |
| Sodium Chloride (NaCl) | 0.2-20 um | 1.5420 | 95% |

| Material | water | solvent | acid |
|---|---|---|---|
| Barium Fluoride (BaF2) | Insoluble | Soluble in methanol/ethanol | |
| Potassium Bromide (KBr) | Soluble | | |
| Potassium Chloride (KCl) | Soluble | | |
| Calcium Fluoride (CaF2) | Insoluble | Insoluble in organic solvents | Reacts to sulfuric acid |
| Sodium Chloride (NaCl) | Soluble | | |

FIG. 6

| Material | Wavelength | Refractive Index (@8um) | Transmission (@8um) | Cost |
|---|---|---|---|---|
| Amtir-1 Ge33 As12 Se55 Glass (GeAsSe) | 0.8-13 um | 2.5 | 82% | |
| Barium Fluoride (BaF2) | 0.15-12.5 um | 1.4258 | 97% | High |
| Potassium Bromide (KBr) | 0.21-28 um | 1.53 | 96% | High |
| Caesium Iodide (CsI) | 0.25-55 um | | | |
| Potassium Chloride (KCl) | 0.21-21 um | 1.4632 | 96% | High |
| Cadmium Telluride (CdTe) | 2-25 um | 2.6773 | 79% | |
| Calcium Fluoride (CaF2) | 0.15-9.0 um | 1.3499 | 98% | ok |
| Gallium Arsenide (GaAs) | 1-15 um | 3.3049 | 71% | ok |
| Sodium Chloride (NaCl) | 0.2-20 um | 1.5064 | 96% | High |
| Germanium (Ge) | 2-17 um | 3.9620 | 64% | High |
| Thallium Bromoiodide KRS-5 (TlBr-TlI) | 0.6-40 um | 2.3745 | 83% | |
| Zinc Selenide Laser Grade (ZnSe CVD) | 0.55-20 um | 2.4060 | 83% | Very high |
| Zinc Sulfide Cleartran (ZnS) | 0.37-14 um | 2.2234 | 86% | Very high |
| Infrared Plastic | 8-12, 15-40 um | | | low |
| a-Si | 0.6-11 um | 3.4 | >90% | low |

FIG. 7

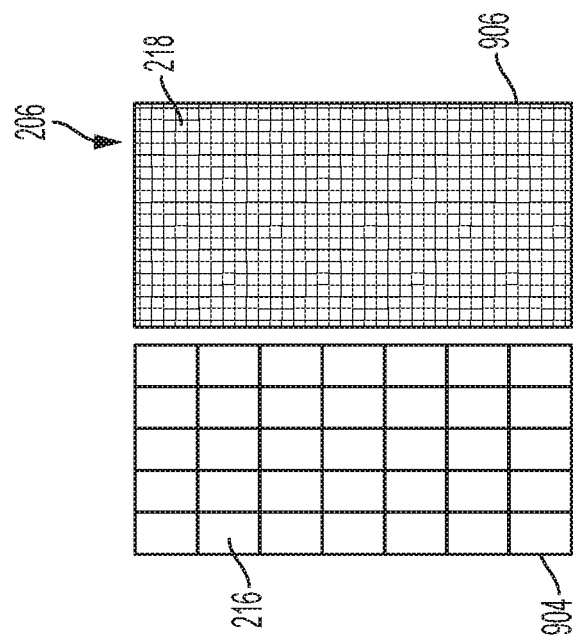
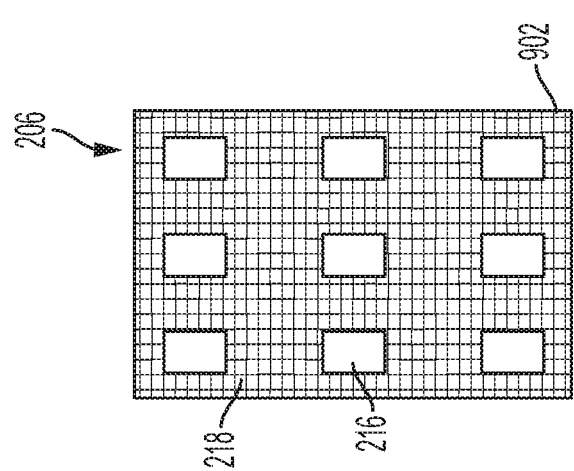
FIG. 9A
FIG. 9B

OPTICAL DEVICE FOR A THERMAL SENSOR AND A HYBRID THERMAL SENSOR

CROSS-REFERENCE TO RELATED APPLICATION(S)

This application claims priority to and the benefit of U.S. Provisional Application No. 63/016,188, filed on Apr. 27, 2020, entitled "FLAT OPTICS AND METALENSES FOR LWIR SENSOR, AND HYBRID VISIBLE/LWIR SENSOR," the entire content of which is incorporated by reference herein.

FIELD

Aspects of one or more example embodiments of the present disclosure relate to optical devices, and more particularly, to optical devices for a thermal sensor and a hybrid thermal sensor.

BACKGROUND

An optical device, for example, such as a lens, may focus external light (e.g., external light rays or external energy rays) on a sensor such that an image (e.g., a thermal image or a visual image) may be generated by the light detected by the sensor. For example, the optical device may be made of a suitable transparent material to transmit the external light through to a sensor, for example, such as a thermal sensor or an image sensor. The sensor may have a spectral sensitivity to a particular electromagnetic spectrum of the external light, such that the sensor may detect the particular spectrum in the external light transmitted thereto. For example, a thermal image may be generated according to a thermal region of the infrared spectrum of the external light detected by a thermal sensor, and a visible image (e.g., an RGB image) may be generated according to a visible spectrum of the external light detected by an image sensor.

The transparent material of the optical device may be selected according to the spectral sensitivity of the sensor in order to transmit the particular spectrum of the external light through to the sensor. For example, for thermal imaging, the transparent material may be an infrared transparent material to allow the thermal region of the infrared spectrum of the external light to be transmitted through to a thermal sensor, and for visual imaging, the transparent material may be a visible-light transparent material to allow a suitable visible spectrum of the external light to be transmitted through to an image sensor. However, infrared transparent materials that are generally used in optical devices and components for thermal sensors may be unsuitable for image sensors, and visible-light transparent materials that are generally used in optical devices and components for image sensors may be unsuitable for thermal sensors.

The above information disclosed in this Background section is for enhancement of understanding of the background of the present disclosure, and therefore, it may contain information that does not constitute prior art.

SUMMARY

One or more example embodiments of the present disclosure are directed to an optical device, and an imaging device including the optical device.

According to one or more example embodiments of the present disclosure, an imaging device includes: a sensor configured to detect a first target spectrum, the first target spectrum corresponding to a thermal imaging region of an infrared (IR) spectrum; and an optical device configured to transmit external light to the sensor, the optical device comprising: a substrate; and a plurality of nanostructures on the substrate, and configured to collimate at least the first target spectrum in the external light on the sensor. The plurality of nanostructures are spaced apart from each other, and at least one of the plurality of nanostructures has a different geometric size from that of another.

In an example embodiment, the first target spectrum may be in a range between 8 µm and 12 µm.

In an example embodiment, the substrate may include calcium fluoride, and the plurality of nanostructures may include a high-index dielectric material.

In an example embodiment, the nanostructures may have a cylindrical or square shape.

In an example embodiment, the plurality of nanostructures may include a first nanostructure configured to collimate the first target spectrum of the external light on a first sensing region of the sensor, and a second nanostructure configured to collimate a second target spectrum of the external light on a second sensing region of the sensor.

In an example embodiment, the first target spectrum may be in a range between 8 µm and 12 µm, and the second target spectrum may be in a range between 0.4 µm and 2.5 µm.

In an example embodiment, the first nanostructure and the second nanostructure may be arranged at one surface of the substrate.

In an example embodiment, the first nanostructure and the second nanostructure may be arranged at opposite surfaces of the substrate from each other.

In an example embodiment, the first nanostructure may have a larger geometric shape than that of the second nanostructure.

In an example embodiment, the substrate may include a first multisector region and a second multisector region that do not overlap with each other in a plan view, and the first nanostructure may include a plurality of first nanostructures arranged at the first multisector region, and the second nanostructure may include a plurality of second nanostructures arranged at the second multisector region.

According to one or more example embodiments of the present disclosure, an optical device includes: a substrate; and a plurality of nanostructures spaced apart on the substrate, and configured to collimate at least a first target spectrum of external light on a sensor, the first target spectrum corresponding to a thermal imaging region of an infrared (IR) spectrum. At least one of the nanostructures have a different geometric size from that of another.

In an example embodiment, the first target spectrum may be in a range between 8 µm and 12 µm.

In an example embodiment, the substrate may include calcium fluoride, and the plurality of nanostructures may include silicon or amorphous silicon.

In an example embodiment, the nanostructures may have a cylindrical shape or a square shape.

In an example embodiment, the plurality of nanostructures may include a first nanostructure configured to collimate the first target spectrum of the external light on a first sensing region of the sensor, and a second nanostructure configured to collimate a second target spectrum of the external light on a second sensing region of the sensor.

In an example embodiment, the first target spectrum may be in a range between 8 µm and 12 µm, and the second target spectrum of the external light may be in a range between 0.4 µm and 2.5 µm.

In an example embodiment, the first and second nanostructures may be arranged at one surface of the substrate, or may be arranged on opposite surfaces of the substrate from each other.

According to one or more example embodiments of the present disclosure, an optical device includes: a substrate; a first nanostructure on the substrate, and configured to collimate a first target spectrum of external light on a first sensing region of a sensor, the first target spectrum corresponding to a thermal imaging region of an infrared (IR) spectrum; and a second nanostructure on the substrate, and configured to collimate a second target spectrum of the external light on a second sensing region of the sensor, the second target spectrum being different from the first target spectrum. The first and second nanostructures have different geometric sizes from each other.

In an example embodiment, the first target spectrum may be in a range between 8 µm and 12 µm, and the second target spectrum may be in a range between 0.4 µm and 2.5 µm.

In an example embodiment, the first nanostructure may have a larger diameter or height than the second nanostructure.

BRIEF DESCRIPTION OF THE DRAWINGS

The above and other aspects and features of the present disclosure will become more apparent to those skilled in the art from the following detailed description of the example embodiments with reference to the accompanying drawings.

FIG. 6 is a table showing a list of example suitable materials for a substrate of the optical device according to one or more example embodiments of the present disclosure.

FIG. 7 is a table showing a list of example suitable materials for a nanostructure of the optical device according to one or more example embodiments of the present disclosure.

FIGS. 9A-9B illustrate various examples of a hybrid thermal sensor according to one or more example embodiments of the present disclosure.

DETAILED DESCRIPTION

Figure 1:
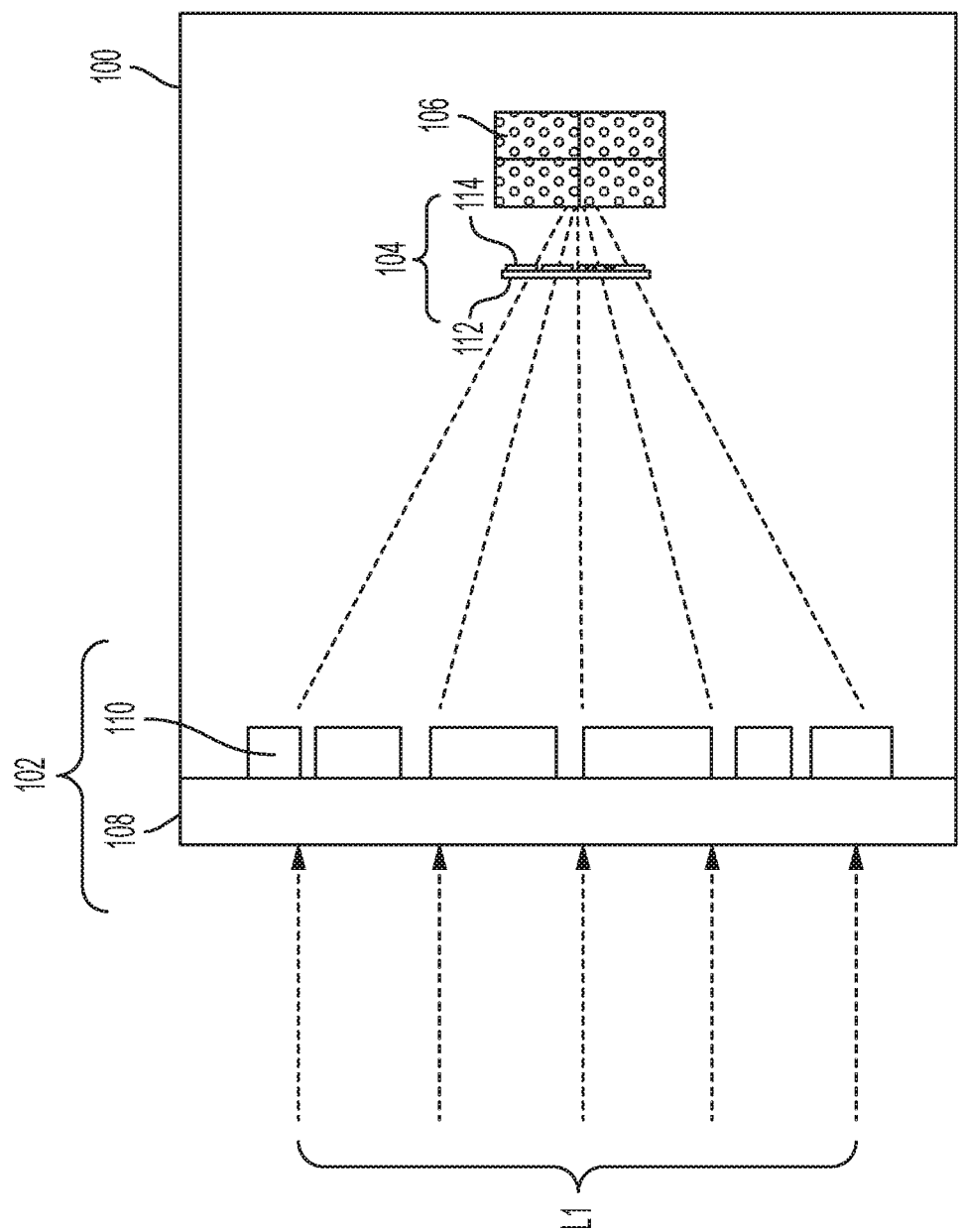
FIG. 1 illustrates a thermal imaging device according to one or more example embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Generally, infrared (IR) (e.g., IR light, IR energy, IR radiation, and the like) is electromagnetic radiation having wavelengths in the electromagnetic spectrum that are longer than those of visible light, and thus, may be generally invisible to the naked human eye. For example, the IR spectrum is a region of the electromagnetic spectrum between the visible region and the microwave region, and may extend from a nominal red edge of the visible region of about 0.7 micro-meters (µm) to a nominal edge of the microwave region of about 1 milli-meter (mm). For example, the IR spectrum includes a near-infrared (NIR) band ranging from about 0.7 µm to about 1.4 µm, a short-wavelength infrared (SWIR) band ranging from about 1.4 µm to about 3 µm, a mid-wavelength infrared (MWIR) band ranging from about 3 µm to about 8 µm, a long-wavelength infrared (LWIR) band ranging from about 8 µm to about 15 µm, and a far infrared (FIR) band ranging from about 15 µm to about 1 mm.

A thermal imaging device may generally utilize a thermal imaging region of the IR spectrum to generate a corresponding thermal image without active illumination (e.g., without active IR illumination). For example, the thermal imaging region of the IR spectrum may include the LWIR band (e.g., the LWIR spectrum) of the IR spectrum corresponding to thermal emissions emitted by an object, such that a corresponding thermal image of the object may be generated without active illumination through detection of the LWIR band in external light. In this case, a thermal sensor of the thermal imaging device may be generally sensitive to the LWIR band of the IR spectrum to detect the thermal emissions in the external light, and may generate a heatmap corresponding to the detected LWIR band in the external light, which may be used to generate the thermal image. Thermal sensors may be important for use in various applications ranging from, for example, security, medicine, and autonomous driving to environmental and industrial monitoring.

An optical device of the thermal imaging device, for example, such as a lens, may transmit the external light (e.g., including the thermal emissions), and may focus (e.g., may bend) the external light onto the thermal sensor. In this case, the optical device for the thermal sensor may be made of a suitable IR-transparent material to enable the thermal emissions in the external light to be transmitted through, and may generally have a suitable phase profile, or curvature and/or thickness to focus (e.g., to bend) the transmitted external light onto the thermal sensor. For example, a lens for a thermal sensor may be made of a suitable IR-transparent material to transmit the LWIR band of the external light through, and may generally have a suitable curvature and/or a suitable thickness to focus the LWIR band in the external light on the thermal sensor.

Optical devices for thermal sensors, for example, such as LWIR sensors, may generally be expensive and/or bulky in size in order to transmit and sufficiently focus the LWIR band of the external light on the thermal sensor. For example, IR-transparent materials that may be generally used for lenses and other optical components in thermal sensors may include (e.g., may be made of), for example, Germanium (Ge), Zinc Selenide (ZnSe), Zinc Sulfide (ZnS), Calcium Fluoride (CaF2), Chalcogenide compounds, and/or the like, or combinations thereof, which may be expensive and/or may cause the lenses and other optical components to be bulky in size (e.g., due to a curvature, a thickness, a weight, and/or the like) in order to sufficiently focus the LWIR band in the external light. Reducing the weight and/or thickness of optical devices for thermal sensors, however, may be desired (e.g., may be crucial), for example, for increasing the range of camera-carrying drones, reducing head and neck injuries among camera-borne soldiers/users or alternative reality (AR)/virtual reality (VR) applications, and/or the like. Accordingly, an optical device for a thermal sensor having decreased size and/or costs (e.g., manufacturing costs) may be desired.

On the other hand, visible-light transparent materials, for example, such as glass and/or the like, that may be generally used for optical devices and components in image sensors, for example, such as Complementary Metal-Oxide-Semiconductor (CMOS) image sensors, may be unsuitable for thermal sensors. Visible-light transparent materials may transmit visible light through corresponding to the visible region of the electromagnetic spectrum including a violet band (e.g., about 380-450 nanometers (nm)), a blue band (e.g., about 450-485 nm), a cyan band (e.g., about 485-500 nm), a green band (e.g., about 500-565 nm), a yellow band (e.g., about 565-590 nm), an orange band (e.g., about 590-625 nm), and a red band (e.g., about 625-740 nm) of the visible spectrum. Glass and other visible-light transparent materials that may be generally used for optical devices and components in image sensors, however, may absorb thermal radiation (e.g., thermal emissions), and thus, may interfere with or may not be able to suitably transmit the LWIR band of the external light through. Thus, optical devices and components that may be generally used for image sensors may be unsuitable for thermal sensors.

Further, due to optics limitations of their respective spectrums, it may be difficult to integrate a thermal sensor with another kind of sensor (e.g., an image sensor and/or the like) as a hybrid thermal sensor (e.g., a multi-spectrum sensor implemented on a single chip) capable of detecting both the LWIR band as well as another target spectrum (e.g., the visible spectrum, the NIR band of the IR spectrum, the SWIR band of the IR spectrum, and/or the like) in the external light. For example, if the optical device of the thermal sensor and the optical device of the image sensor are integrated at the same or substantially the same optical path length as each other, they may interfere with each other as they may absorb the respective spectrums of light transmitted through. However, combining visible imaging and thermal imaging into one sensor (e.g., a hybrid sensor) may lower system costs and power consumption, may enable better night vision applications, may improve object recognition accuracy (e.g., especially live objects), may enhance security and surveillance, and/or the like. Accordingly, an optical device that may transmit and focus (e.g., collimate) the LWIR band of the IR spectrum and at least one other target spectrum (e.g., the visible spectrum, the NIR band of the IR spectrum, the SWIR band of the IR spectrum, and/or the like) of the external light onto different sensing regimes (e.g., different sensing regions) of a hybrid thermal sensor may be desired.

According to one or more example embodiments of the present disclosure, an optical device, and an imaging device including the optical device may be provided. In some embodiments, the optical device may include a rigid or a flexible transparent substrate, and a plurality of nanostructures disposed on the transparent substrate. For example, in some embodiments, the optical device may include (e.g., may be) a thin dielectric metasurface flat lens (e.g., a metalens). The transparent substrate may include a suitable transparent material to transmit one or more target spectrums of external light through. The nanostructures may be disposed on the substrate to have different geometric structures and/or arrangements to focus the one or more target spectrums of external light at the same or substantially the same focal distance for each respective wavelength, or at different focal distances from the same or substantially the same spatial location or from different spatial locations depending on the desired application, implementation, arrangement, structure, and/or the like of the imaging device.

In some embodiments, the transparent material may be transparent to at least the thermal region of the IR spectrum in external light. For example, in some embodiments, the transparent material may transmit a target range in the LWIR band of the IR spectrum. In some embodiments, instead of focusing the external light according to a curvature and/or a thickness of the substrate, the nanostructures may be disposed on the substrate to focus the target range of the LWIR band wavelengths in the external light on a thermal sensor, for example, such as a LWIR sensor, such that a thermal image may be generated according to the LWIR band wavelengths in the external light detected by the thermal sensor. Accordingly, in some embodiments, a size (e.g., a thickness) of the substrate may be reduced, and thus, an optical device for a thermal sensor having reduced cost, weight, and/or size may be provided.

In some embodiments, the transparent material may further be transparent to another target spectrum (e.g., the visible spectrum, the NIR band of the IR spectrum, the SWIR band of the IR spectrum, and/or the like) in the external light, in addition to the LWIR band of the IR spectrum. For example, in some embodiments, the transparent material may transmit the target range in the LWIR band of the IR spectrum, as well as a target range in the visible spectrum. In this case, in some embodiments, the nanostructures may include a plurality of first nanostructures disposed on the substrate to focus the target LWIR band wavelengths in the external light to a thermal sensing region of a hybrid thermal sensor, and a plurality of second nanostructures disposed on the substrate to focus target wavelengths in the visible spectrum of the external light on an image sensing region of the hybrid thermal sensor, for example. A hybrid image (e.g., a thermal/visible image) may be generated according to the respective wavelengths detected by the hybrid thermal sensor. Accordingly, in some embodiments, an optical device that may transmit and focus two or more different spectrums of the external light onto different sensing regions for a hybrid thermal sensor may be provided.

The above and other aspects and features of the present disclosure will be described in more detail hereinafter with reference to the figures.

FIG. 1 illustrates a thermal imaging device according to one or more example embodiments of the present disclosure.

Referring to FIG. 1, the thermal imaging device 100 according to one or more example embodiments of the present disclosure may be an imaging device (e.g., a thermal camera, a night-vision camera, and/or the like) that generates a thermal image by detecting a target IR spectrum L1 in external light without active illumination. For example, in some embodiments, the thermal imaging device 100 may include one or more optical devices 102 and 104, and one or more thermal sensors 106. The one or more optical devices 102 and 104 may transmit the external light therethrough to the one or more thermal sensors 106, and the one or more thermal sensors 106 may have a suitable spectral sensitivity to the target IR spectrum L1 in order to detect the target IR spectrum L1 in the external light transmitted thereto. The one or more thermal sensors 106 may generate a heatmap according to the target IR spectrum L1 detected from the external light transmitted thereto, which may be used to generate the thermal image. The thermal sensors 106 may be cooled infrared photodetector based on narrow- or wide bandgap semiconductors or uncooled photodetector based on pyroelectric and ferroelectric materials or microbolometer technology.

In some embodiments, the target IR spectrum L1 may correspond to a target range within the thermal imaging region of the IR spectrum. For example, in some embodiments, the target IR spectrum L1 may correspond to the LWIR band of the IR spectrum. In this case, the target IR spectrum L1 may include an entire range of the LWIR band of the IR spectrum, or may include a sub-range within the LWIR band of the IR spectrum that is suitable for thermal imaging, for example, such as a range between about 8 μm to about 12 μm (e.g., a range between 8 μm and 12 μm), but the present disclosure is not limited thereto. For example, in other embodiments, the target IR spectrum L1 may include a range that partially overlaps with a band in the IR spectrum adjacent to the LWIR band, for example, such as a nominal edge of the MWIR band in the IR spectrum.

In some embodiments, the one or more thermal sensors 106 may include (e.g., may be) one or more high-resolution thermal sensors capable of detecting the target IR spectrum L1 in the external light transmitted thereto without active illumination, such that a suitable thermal image (e.g., a high-resolution thermal image) may be generated. For example, in some embodiments, the one or more thermal sensors 106 may include (e.g., may be) a LWIR sensor array, a LWIR resistive microbolometer, a LWIR capacitive microbolometer, and/or the like to detect the target LWIR band in the external light transmitted thereto, and to generate a suitable heat map according to the detected target LWIR band in the external light.

In some embodiments, the one or more optical devices 102 and 104 may include a first optical device 102 and a second optical device 104. The first optical device 102 may include (e.g., may be), for example, a global lens of the thermal imaging device 100. The second optical device 104 may include (e.g., may be), for example, one or more micro-lenses of the thermal imaging device 100. In this case, for example, the first optical device 102 may focus the target IR spectrum L1 in the external light on the second optical device 104, and the second optical device 104 may focus the target IR spectrum L1 of the external light on the one or more thermal sensors 106. For example, if the thermal sensor 106 includes the LWIR sensor array, the second optical device 104 may include a plurality of micro-lenses, each of the micro-lenses corresponding to one or more sensor pixels of the LWIR sensor array to focus the target IR spectrum L1 of the external light on the corresponding one or more sensor pixels.

However, the present disclosure is not limited thereto, and in other embodiments, the optical devices 102 and 104 may include more or less optical devices than those shown in FIG. 1. For example, in some embodiments, the first optical device 102 may include a plurality of global lenses that are stacked on one another, or one of the first optical device 102 or the second optical device 104 may be omitted depending on a structure or an application of the thermal imaging device 100. For example, in some embodiments, if the thermal imaging device 100 is implemented with an aperture, the first optical device 102 (e.g., the global lens) may be omitted. In another example, if the second optical device 104 is omitted, the first optical device 102 may directly focus the target IR spectrum L1 in the external light on the one or more thermal sensors 106.

In some embodiments, the first optical device 102 may include a substrate 108 and a plurality of nanostructures 110 disposed on the substrate 108. The substrate 108 may be a flexible substrate or a rigid substrate, and may be formed of a suitable transparent material to transmit at least the target IR spectrum L1 of the external light through. For example, in some embodiments, the transparent material may include calcium fluoride ($CaF_2$). However, the present disclosure is not limited thereto, and in other embodiments, the transparent material may include any suitable material that may transmit the target IR spectrum L1 through, for example, such as polymers, silicon (Si), barium fluoride ($BaF_2$), potassium bromide (KBr), potassium chloride (KCl), sodium chloride (NaCl), and/or the like, or a combination thereof.

In some embodiments, the substrate 108 may be flat or substantially flat, but the present disclosure is not limited thereto, and the substrate 108 may have a suitable curvature. For example, in some embodiments, when the substrate 108 is a flexible substrate, the substrate 108 may be flexed (e.g., bent, bowed, and/or the like) to have a curvature. In some embodiments, the transparent material of the substrate may be further transparent to one or more other target spectrums (e.g., the visible spectrum, the NIR band of the IR spectrum, the SWIR band of the IR spectrum, and/or the like), such that the one or more other target spectrums may be suitably transmitted through, but the present disclosure is not limited thereto.

In some embodiments, the nanostructures 110 may be disposed on the substrate 108, and may have various suitable materials, geometric dimensions, and/or arrangements to focus (e.g., to collimate) the relevant wavelengths in the external light propagating therethrough to the one or more thermal sensors 106 via the second optical device 104. For example, as the external light is propagating through the nanostructures 110, the nanostructures 110 may change a phase of the relevant wavelengths corresponding to the target IR spectrum L1 in the external light to collimate the relevant wavelengths of the external light on the one or more thermal sensors 106 via the second optical device 104. However, the present disclosure is not limited thereto, and if the second optical device 104 is omitted, the nanostructures 110 of the first optical device 102 may focus (e.g., may collimate) the relevant wavelengths of the external light transmitted therethrough directly on the one or more thermal sensors 106. In some embodiments, the nanostructures 110 may further filter (e.g., may block) unwanted spectrums of the external light, for example, that may interfere with the target IR spectrum L1.

In some embodiments, the nanostructures 110 may be formed of a high-index dielectric material, for example, such as amorphous silicon (a-Si), or any other suitable dielectric material, for example, such as c-Si, p-Si, Ge, GaAs, ZnS, ZnSe, and/or the like, or a combination thereof. In this case, in some embodiments, the nanostructures 110 may be formed using a low cost, single-step ultraviolet (UV) binary lithography process, but the present disclosure is not limited thereto. For example, in other embodiments, the nanostructures 110 may be formed of any suitable material that may suitably transmit and collimate the target IR spectrum L1 of the external light, for example, such as any suitable one of the example materials or a suitable combination thereof shown in FIG. 7, and/or the like. The nanostructures 110 will be described in more detail below with reference to FIGS. 3 through 8.

In some embodiments, the second optical device 104 may include a substrate 112 and a plurality of nanostructures 114 arranged on the substrate 112. The substrate 112 may be a flexible substrate or a rigid substrate, and may be formed of a suitable transparent material to transmit at least the target IR spectrum L1 from the external light transmitted thereto by the first optical device 102. For example, in some embodiments, the transparent material may include calcium fluoride (CaF2). However, the present disclosure is not limited thereto, and in other embodiments, the transparent material may include any suitable material that may transmit the target IR spectrum L1 therethrough, for example, such as barium fluoride (BaF2), potassium bromide (KBr), potassium chloride (KCl), sodium chloride (NaCl), and/or the like, or a combination thereof. In some embodiments, the transparent material of the substrate 112 may be the same or substantially the same as the transparent material of the substrate 108, but the present disclosure is not limited thereto.

In some embodiments, the nanostructures 114 disposed on the substrate 112 may further focus (e.g., may further collimate) the target IR spectrum L1 of the external light propagating through on the one or more thermal sensors 106. For example, in some embodiments, the external light transmitted through the first optical device 102 may diverge or may not converge as desired or expected. In this case, the nanostructures 114 may further focus (e.g., may further collimate) the diverged light onto the one or more thermal sensors 106, for example, to one or more respective sensor pixels associated with the second optical device 104 in the case of the LWIR sensor array. In some embodiments, the nanostructures 114 may further filter (e.g., may block) unwanted spectrums of the external light propagating therethrough, for example, that may interfere with the target IR spectrum L1 of the external light.

For example, in some embodiments, the nanostructures 114 may be disposed on the substrate 112, and may have various suitable materials, geometric dimensions, and/or arrangements, such that the nanostructures 114 may suitably change a phase of the relevant wavelengths of the external light propagating therethrough to collimate the relevant wavelengths of the external light on the one or more thermal sensors 106 (e.g., to one or more respective sensor pixels thereof). In some embodiments, the nanostructures 114 may be formed of a high-index dielectric material, for example, such as amorphous silicon (a-Si), or any other suitable dielectric material, for example, such as c-Si, p-Si, Ge, GaAs, ZnS, ZnSe, and/or the like, or a combination thereof. In this case, in some embodiments, the nanostructures 114 may be formed using a low cost, single-step ultraviolet (UV) binary lithography process, but the present disclosure is not limited thereto. For example, in other embodiments, the nanostructures 114 may be formed of any suitable material that may suitably transmit and collimate the target IR spectrum L1 of the external light propagating thereto, for example, such as any one of the example materials or a suitable combination thereof shown in FIG. 7, and/or the like. In some embodiments, the nanostructures 114 may be formed of the same or substantially the same material as that of the nanostructures 110, but the present disclosure is not limited thereto. The nanostructures 114 will be described in more detail below with reference to FIGS. 3 through 8.

According to one or more example embodiments of the present disclosure, the optical devices 102 and 104 for the thermal imaging device 100 may have a reduced size and/or costs when compared to a comparative lens that may be generally used for thermal imaging devices. For example, because the optical devices 102 and 104 may include the nanostructures 110 and 114 to transmit and collimate the target IR spectrum L1 of the external light on the one or more thermal sensors 106, a thickness, a curvature, a weight, and/or the like of the optical devices 102 and 104 may be reduced, and/or costs for manufacturing the optical devices 102 and 104 may be reduced.

Figure 2A:
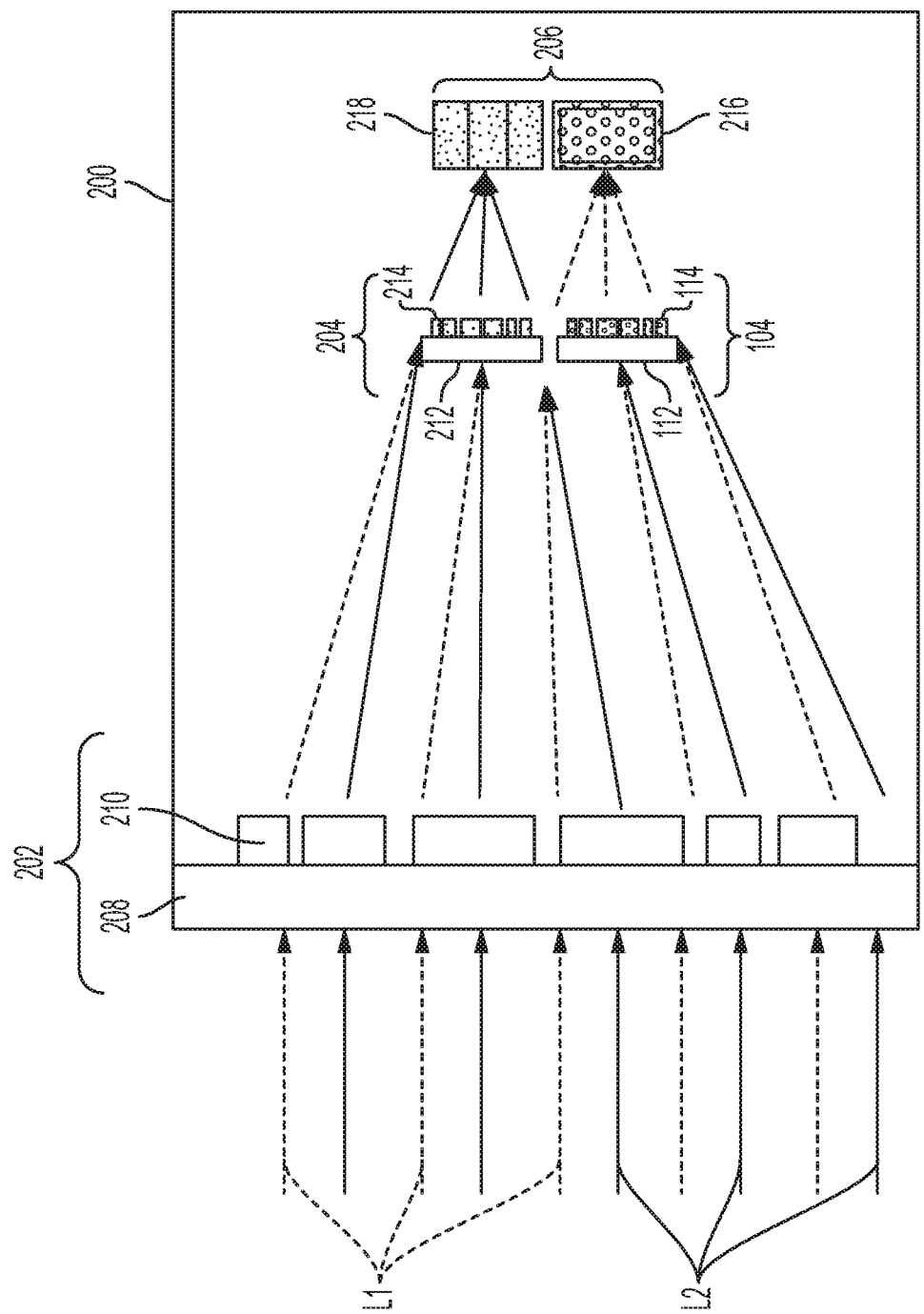
FIGS. 2A-2C illustrate a hybrid thermal imaging device according to one or more example embodiments of the present disclosure.
Figure 2B:
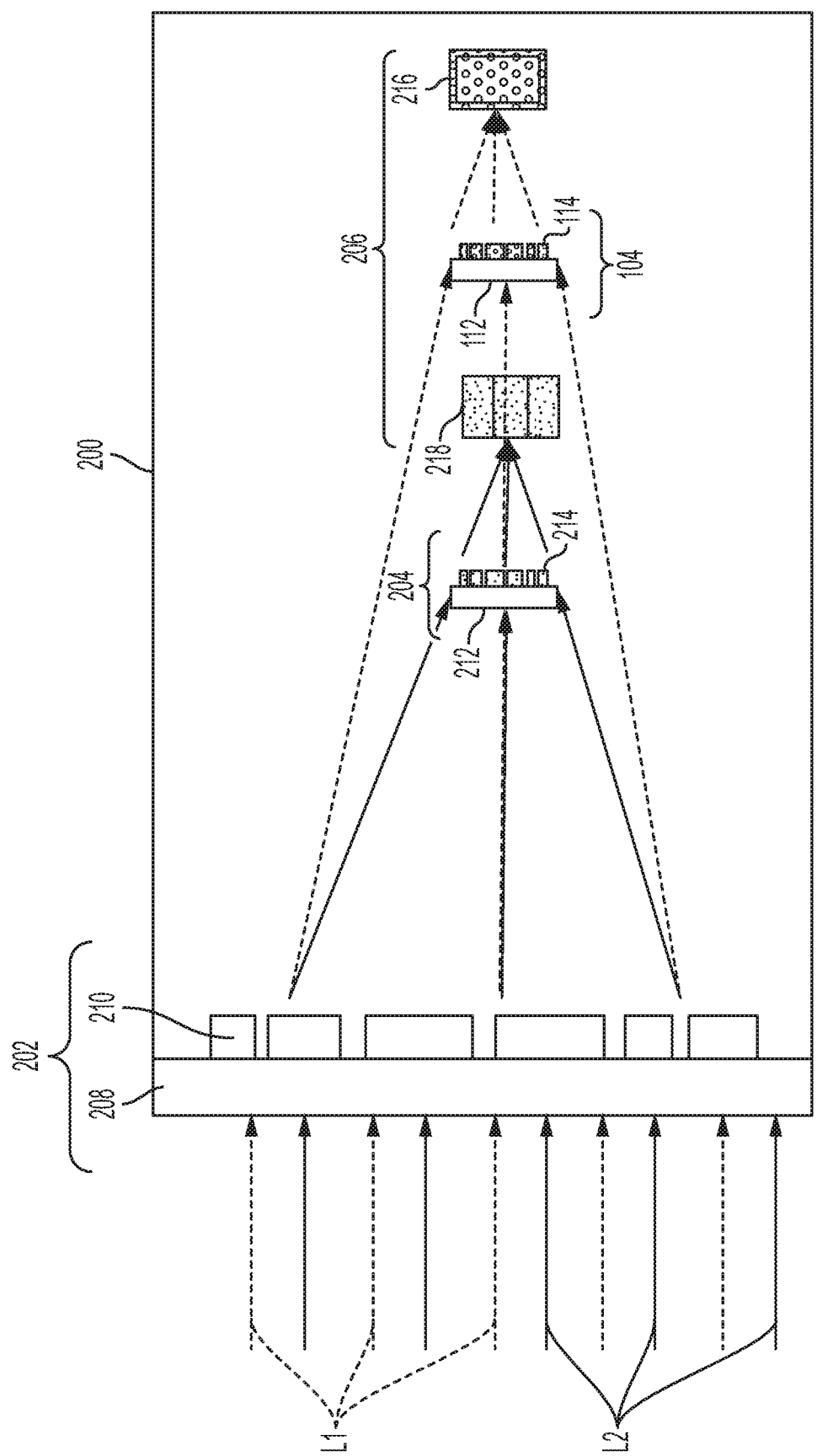
Figure 2C:
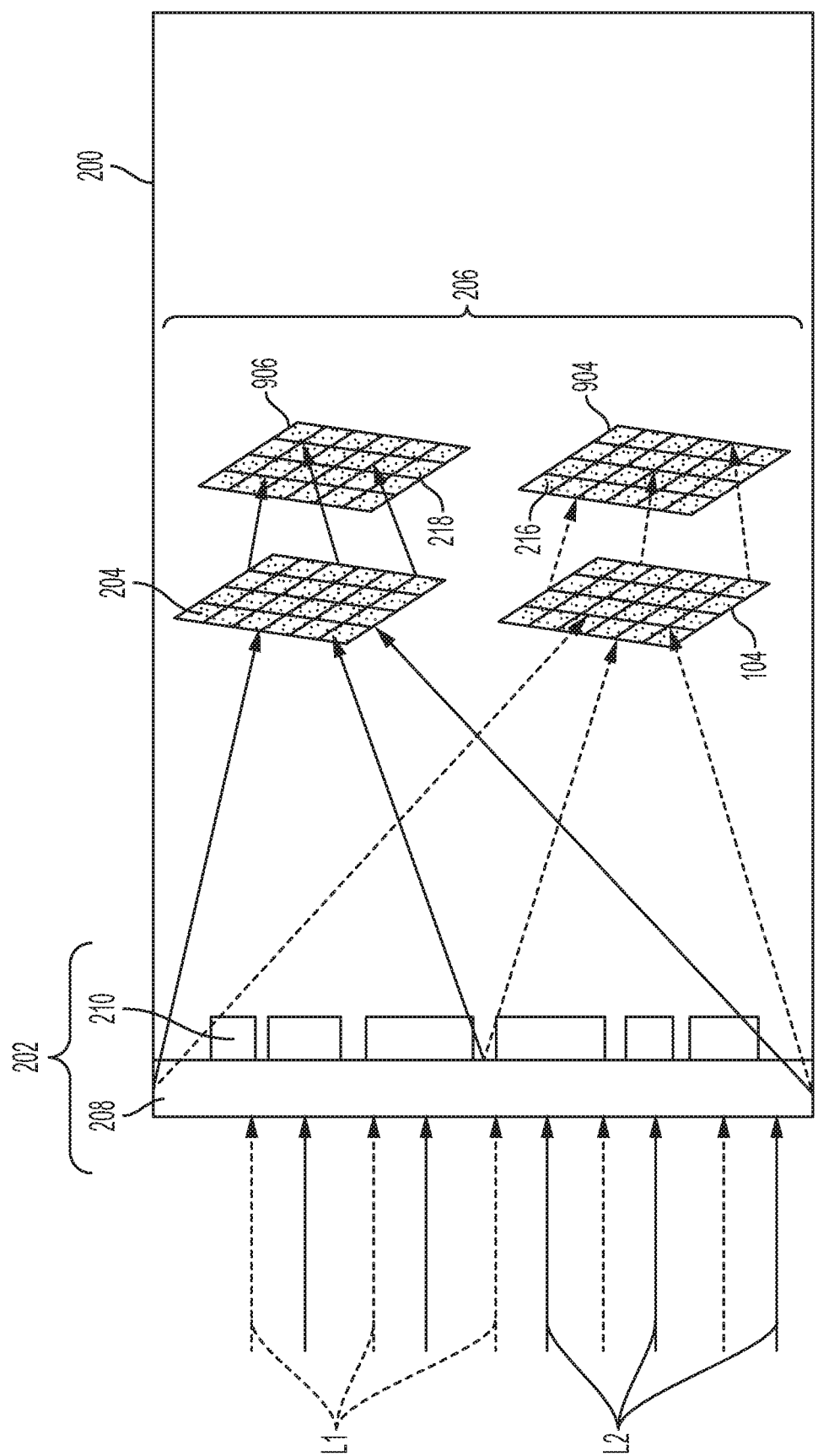

FIGS. 2A through 2C illustrate various examples of a hybrid thermal imaging device according to one or more example embodiments of the present disclosure. FIGS. 9A and 9B illustrate various examples of a hybrid thermal sensor according to one or more example embodiments of the present disclosure.

Referring to FIGS. 2A through 2C, the hybrid thermal imaging device 200 according to one or more example embodiments of the present disclosure may be an imaging device (e.g., a camera) that includes a hybrid thermal sensor (e.g., a thermal sensor combined with another kind of sensor) 206 to generate a combined hybrid thermal image. A combined hybrid thermal image as used in this specification may be an image generated according to a combination of a thermal image with another kind of image, for example, such as a visible image (e.g., an RGB image). In other words, the combined hybrid thermal image may be an image that is generated by combining thermal information with another kind of spectral information detected in the external light by the hybrid thermal sensor 206, for example, such as visible light.

Generally, in order to combine a thermal image with a visible image (e.g., an RGB image), due to the optics limitations of their respective spectrums as discussed above, a thermal camera including a thermal sensor may be used to generate the thermal image, and a separate image camera (e.g., a separate CMOS camera) including an image sensor (e.g., a CMOS sensor) may be used to generate the visible image. In this case, the thermal image generated by the thermal camera may be combined with the visible image generated by the separate image camera using complex image processing techniques, for example, to align different views (e.g., different field-of-views) of the thermal camera and the separate image camera, and/or to merge their respective views with each other. However, in this case, system costs and/or power consumption may be increased, and latency may be introduced.

According to one or more example embodiments of the present disclosure, the hybrid thermal imaging device 200 may include the hybrid thermal sensor 206 and one or more optical devices 202, 104, and 204. The hybrid thermal sensor 206 may detect the target IR spectrum L1 in external light without active illumination, as well as another target spectrum L2 (e.g., the visible spectrum, the NIR band of the IR spectrum, the SWIR band of the IR spectrum, and/or the like) in the external light that is different from the target IR spectrum L1, such that a combined hybrid thermal image may be generated according to the different spectrums detected by the hybrid thermal sensor 206. The one or more optical devices 202, 104, and 204 may transmit both the target IR spectrum L1 and the other target spectrum L2 in the external light, and may focus (e.g., may collimate) the target IR spectrum L1 and the other target spectrum L2 to respective sensing regions of the hybrid thermal sensor 206. Accordingly, in some embodiments, system costs and/or power consumption may be reduced, and latency may be reduced.

In more detail, in some embodiments, the hybrid thermal sensor 206 may include a first sensing region 216 and a second sensing region 218. The first sensing region 216 may have a suitable spectral sensitivity to the target IR spectrum L1, and the second sensing region 218 may have a suitable spectral sensitivity to the other target spectrum L2. For example, the target IR spectrum L1 may correspond to a target range corresponding to the LWIR band of the IR spectrum as discussed above, and the other spectrum L2 may correspond to a target range outside of the LWIR band, for example, such as a target range in the visible spectrum, the NIR band of the IR spectrum, the SWIR band of the IR spectrum, and/or the like. For a non-limiting example, in some embodiments, the target IR spectrum L1 may include a range between about 8 μm to about 12 μm (e.g., a range between 8 μm and 12 μm), and the other target spectrum L2 may include a range between about 0.4 μm to about 2.5 μm (e.g., a range between 0.4 μm and 2.5 μm). For convenience, the other target spectrum L2 may be described hereinafter in the context of the visible spectrum, but the present disclosure is not limited thereto.

In some embodiments, the first sensing region 216 and the second sensing region 218 may be implemented as a sensor array including a plurality of first sensor pixels and a plurality of second sensor pixels. For example, in some embodiments, the first sensing region 216 may include the first sensor pixels corresponding to LWIR sensor pixels to detect the target IR spectrum L1, and the second sensing region 216 may include the second sensor pixels corresponding to image sensor pixels (e.g., CMOS sensor pixels) to detect the other target spectrum L2. In this case, the first sensor pixels of the first sensing region 216 and the second sensor pixels of the second sensing region 218 may have any suitable arrangement with respect to each other, for example, such as a pentile arrangement, a stripe arrangement, a side-by-side arrangement, a stacked arrangement, and/or the like.

As a non-limiting example, as shown in FIGS. 2A and 9A, in some embodiments, the hybrid thermal sensor 206 may be implemented as an interleaved sensor pixel array 902 including a plurality of the first sensing regions 216 implemented as a plurality of the first sensor pixels, and a plurality of the second sensing regions 218 implemented as a plurality of the second sensor pixels. In this case, the first sensor pixels and the second sensor pixels of the interleaved sensor pixel array 902 may be arranged to have any suitable interleaved arrangement with respect to each other. As another non-limiting example, as shown in FIGS. 2C and 9B, in some embodiments, the hybrid thermal sensor 206 may be implemented as a multi-sectoral sensor pixel array including a first pixel array 904 and a second pixel array 906. The first pixel array 904 may include the plurality of first sensing regions 216 implemented as a plurality of the first sensor pixels, and the second pixel array 906 may include the plurality of second sensing regions 218 implemented as a plurality of the second sensor pixels.

In some embodiments, as shown in FIGS. 2A and 2C, the first sensing region 216 and the second sensing region 218 may be disposed at a same plane as each other (e.g., may be disposed at a same layer as each other), and/or as shown in FIG. 2B, the first sensing region 216 and the second sensing region 218 may be stacked on one another (e.g., may be disposed at different layers from each other). Accordingly, focal lengths of the first and second sensing regions 216 and 218 of the hybrid thermal sensor 206 may be the same or substantially the same as each other, or may be different from each other.

In some embodiments, the one or more optical devices 202, 104, and 204 may include a first optical device 202, a second optical device 104, and a third optical device 204. The first optical device 202 may include (e.g., may be), for example, a global lens of the hybrid thermal imaging device 200. Each of the second and third optical devices 104 and 204 may include (e.g., may be), for example, one or more micro-lenses of the hybrid thermal imaging device 200. For example, the second optical device 104 may correspond to the first sensing region 216 of the hybrid thermal sensor 206, and may include a plurality of micro-lenses, each of the micro-lenses corresponding to one or more of the first sensor pixels of the first sensing region 216. The third optical device 204 may correspond to the second sensing region 218 of the hybrid thermal sensor 206, and may include a plurality of micro-lenses, each of the micro-lenses corresponding to one or more of the second sensor pixels of the second sensing region 218. For example, an arrangement of the micro-lenses of the second optical device 104 and the third optical device 204 may correspond to (e.g., may follow) an arrangement of the sensor pixel array of the hybrid thermal sensor 206 (e.g., interleaved, side-by-side, stacked, and/or the like).

The first optical device 202 may focus the target IR spectrum L1 and the other target spectrum L2 of the external light on the first and second regions 216 and 218 of the hybrid thermal sensor 206 via the second and third optical devices 104 and 204, and the second and third optical devices 104 and 204 may further focus the target IR spectrum L1 and the other target spectrum L2 on the first and second sensing regions 216 and 218 of the hybrid thermal sensor 206, respectively. For example, in some embodiments, the second optical device 104 may further focus the target IR spectrum L1 of the light transmitted through the first optical device 202 on the first sensing region 216 of the hybrid thermal sensor 206, and the third optical device 204 may further focus the other target spectrum L2 of the light transmitted through the first optical device 202 on the second sensing region 218 of the hybrid thermal sensor 206.

However, the present disclosure is not limited thereto, and in other embodiments, the optical devices 202, 104, and 204 may include more or less optical devices than those shown in FIGS. 2A and 2B. For example, in some embodiments, the first optical device 202 may include a plurality of global lenses that are stacked on one another, or one or more of the first optical device 202, the second optical device 104, or the third optical device 204 may be omitted depending on a structure or an application of the hybrid thermal imaging device 200. For example, in some embodiments, if the hybrid thermal imaging device 200 is implemented with an aperture, the first optical device 202 (e.g., the global lens) may be omitted. In another example, if the second optical device 104 and/or the third optical device 204 is omitted, the first optical device 202 may directly focus the target IR spectrum L1 of the external light on the first sensing region 216, and/or may directly focus the other target spectrum L2 of the external light on the second sensing region 218.

In some embodiments, the first optical device 202 may include a substrate 208 and a plurality of nanostructures 210 disposed on the substrate 208. The substrate 208 may be a flexible substrate or a rigid substrate, and may be formed of a suitable transparent material to suitably transmit at least both the target IR spectrum L1 and the other target spectrum L2 in the external light. For example, in some embodiments, the transparent material may include calcium fluoride (CaF2). However, the present disclosure is not limited thereto, and in other embodiments, the transparent material may include any suitable material that may suitably transmit at least both the target IR spectrum L1 and the other target spectrum L2 through, for example, such as polymers, silicon (Si), barium fluoride (BaF2), potassium bromide (KBr), potassium chloride (KCl), sodium chloride (NaCl), and/or the like, or a combination thereof. In some embodiments, the substrate 208 may be flat or substantially flat, but the present disclosure is not limited thereto, and the substrate 208 may have a suitable curvature. For example, in some embodiments, when the substrate 208 is a flexible substrate, the substrate 208 may be flexed (e.g., bent, bowed, and/or the like) to have a curvature.

In some embodiments, the nanostructures 210 disposed on the substrate 208 may focus (e.g., may collimate) the target IR spectrum L1 and the other target spectrum L2 of the external light propagating through on the first and second sensing regions 216 and 218 of the hybrid thermal sensor 206 via the second and third optical devices 104 and 204, respectively. However, the present disclosure is not limited thereto, and if the second and third optical devices 104 and 204 are omitted, the nanostructures 210 of the first optical device 202 may focus (e.g., may collimate) the target IR spectrum L1 and the other spectrum L2 of the external light propagating through directly to respective sensing regions 216 and 218 of the hybrid thermal sensor 206.

For example, in some embodiments, the nanostructures 210 may be disposed on the substrate 208 to have various suitable geometric dimensions and/or arrangements, such that the nanostructures 210 may change a phase of the target IR spectrum L1 of the external light propagating through to sufficiently collimate the target IR spectrum L1 of the external light on the second optical device 104 (or on the first sensing region 216 directly), and may change a phase of the other target spectrum L2 of the external light propagating through to sufficiently collimate the other target spectrum L2 on the third optical device 204 (or on the second sensing region 218 directly). For example, in some embodiments, the nanostructures 210 may include a plurality of first nanostructures and a plurality of second nanostructures (e.g., see FIGS. 5A-5D and 10A-10B). The plurality of first nanostructures may focus (e.g., may collimate) the target IR spectrum L1 of the external light propagating through on the second optical device 104 (or on the first sensing region 216 directly), and the second nanostructures may focus (e.g., may collimate) the other target spectrum L2 of the external light propagating through on the third optical device 204 (or on the second sensing region 218 directly).

In various embodiments, the nanostructures 210 may focus the external light at the same or substantially the same focal distance for each wavelength of the target spectrums L1 and L2, or at different focal distances at the same or substantially the same spatial location or at different spatial locations. For example, when the first and second sensing regions 216 and 218 (or the second and third optical devices 104 and 204) of the hybrid thermal sensor 206 are disposed at the same or substantially the same focal length from the first optical device 202 as each other, for example, as shown in FIGS. 2A and 2C, the first and second nanostructures of the nanostructures 210 may focus the wavelengths of their respective target spectrum L1 and L2 at the same or sub-stantially the same focal distance as each other. In another example, when the first and second sensing regions 216 and 218 (or the second and third optical devices 104 and 204) of the hybrid thermal sensor 206 are disposed at different focal lengths from the first optical device 202 as each other, for example, as shown in FIG. 2B, the first and second nanostructures of the nanostructures 210 may focus the wavelengths of their respective target spectrum L1 and L2 at different focal lengths from each other.

In some embodiments, the nanostructures 210 may be formed of a high-index dielectric material, for example, such as amorphous silicon (a-Si), or any other suitable dielectric material, for example, such as c-Si, p-Si, Ge, GaAs, ZnS, ZnSe, Si3N4, TiO2, HfO2, and/or the like, or a combination thereof. In this case, in some embodiments, the nanostructures 210 may be formed using a low cost, single-step ultraviolet (UV, deep UV) binary lithography process, but the present disclosure is not limited thereto. For example, in other embodiments, the nanostructures 210 may be formed of any suitable material to suitably transmit and collimate the target spectrums L1 and L2 of the external light, for example, such as any suitable one of the example materials or a suitable combination thereof shown in FIG. 7, and/or the like. In some embodiments, the first and second nanostructures of the nanostructures 210 may include the same or substantially the same material as each other, or may include different materials from each other. The nanostructures 210 will be described in more detail below with reference to FIGS. 3 through 8 and 10.

In some embodiments, the second optical device 104 may include a substrate 112 and a plurality of nanostructures 114 arranged on the substrate 112. The substrate 112 may be a flexible substrate or a rigid substrate, and may be formed of a suitable transparent material to transmit at least the target IR spectrum L1 from the external light transmitted thereto by the first optical device 202. For example, in some embodiments, the transparent material may include calcium fluoride (CaF2), polymer, SiO2, or silicon (Si). However, the present disclosure is not limited thereto, and in other embodiments, the transparent material may include any suitable material that may sufficiently transmit the target IR spectrum L1, for example, such as polymers, silicon (Si, a-Si, p-Si), barium fluoride (BaF2), potassium bromide (KBr), potassium chloride (KCl), sodium chloride (NaCl), and/or the like, or a combination thereof. In some embodiments, the transparent material of the substrate 112 may be the same or substantially the same as the transparent material of the substrate 208, but the present disclosure is not limited thereto.

In some embodiments, the nanostructures 114 disposed on the substrate 112 may further focus (e.g., may further collimate) the target IR spectrum L1 of the external light propagating therethrough to the first sensing region 216 of the hybrid thermal sensor 206. For example, in some embodiments, the external light transmitted through the first optical device 202 may diverge or may not converge as desired or expected. In this case, the nanostructures 114 may further focus (e.g., may further collimate) the diverged light on the first sensing region 216 of the hybrid thermal sensor 206, for example, on one or more respective first sensor pixels associated with the second optical device 104. In some embodiments, the nanostructures 114 may further filter (e.g., may block) unwanted spectrums of the external light propagating therethrough, for example, that may interfere with the target IR spectrum L1 of the external light.

For example, in some embodiments, the nanostructures 114 may be disposed on the substrate 112 to have various suitable materials, geometric dimensions, and/or arrangements to sufficiently transmit and collimate the target IR spectrum L1 of the external light on the first sensing region 216 of the hybrid thermal sensor 206 (e.g., on one or more respective first sensor pixels thereof). In some embodiments, the nanostructures 114 may be formed of a high-index dielectric material, for example, such as amorphous silicon (a-Si), or any other suitable dielectric material, for example, such as silicon (c-Si, p-Si), barium fluoride (BaF2), potassium bromide (KBr), potassium chloride (KCl), sodium chloride (NaCl), and/or the like, or a combination thereof. In this case, in some embodiments, the nanostructures 114 may be formed using a low cost, single-step ultraviolet (UV, deep UV) binary lithography process, but the present disclosure is not limited thereto. For example, in other embodiments, the nanostructures 114 may be formed of any suitable material to suitably collimate the target IR spectrum L1 of the external light propagating therethrough, for example, such as any suitable one of the example materials or a suitable combination thereof shown in FIG. 7, and/or the like. The nanostructures 114 will be described in more detail below with reference to FIGS. 3 through 8.

In some embodiments, the third optical device 204 may include a substrate 212 and a plurality of nanostructures 214 arranged on the substrate 212. The substrate 212 may be a flexible substrate or a rigid substrate, and may be formed of a suitable transparent material to transmit at least the other target spectrum L2 through from the external light transmitted thereto by the first optical device 202. For example, in some embodiments, the transparent material may include calcium fluoride (CaF2). However, the present disclosure is not limited thereto, and in other embodiments, the transparent material may include any suitable material that may transmit the other target spectrum L2 therethrough, for example, such as polymers, Silicon (a-Si, c-Si, p-Si), $SiO_2$, barium fluoride (BaF2), potassium bromide (KBr), potassium chloride (KCl), sodium chloride (NaCl), and/or the like, or a combination thereof. In some embodiments, the transparent material of the substrate 212 may be the same or substantially the same as the transparent material of the substrate 112, or may be different from that of the substrate 112.

In some embodiments, the nanostructures 214 disposed on the substrate 212 may further focus (e.g., may further collimate) the other target spectrum L2 of the external light propagating therethrough on the second sensing region 218 of the hybrid thermal sensor 206. For example, in some embodiments, the external light transmitted through the first optical device 202 may diverge or may not converge as desired or expected. In this case, the nanostructures 214 may further focus (e.g., may further collimate) the diverged light on the second sensing region 218 of the hybrid thermal sensor 206, for example, on one or more respective second sensor pixels associated with the third optical device 204. In some embodiments, the nanostructures 214 may further filter (e.g., may block) unwanted spectrums of the external light propagating therethrough, for example, that may interfere with the other target spectrum L2 of the external light.

For example, in some embodiments, the nanostructures 214 may be disposed on the substrate 212 to have various suitable materials, geometric dimensions, and/or arrangements to transmit and collimate the other target spectrum L2 of the external light towards the second sensing region 218 of the hybrid thermal sensor 206 (e.g., to one or more respective second sensor pixels thereof). In some embodiments, the nanostructures 214 may be formed of a high-index dielectric material, for example, such as amorphous silicon (a-Si) or any other suitable dielectric material, for example, such as silicon nitride ($Si_3N_4$), titania ($TiO_2$), silicon (c-Si, p-Si), and/or the like, or a combination thereof. In this case, in some embodiments, the nanostructures 214 may be formed using a low cost, single-step ultraviolet (UV, deep UV) binary lithography process, but the present disclosure is not limited thereto. For example, in other embodiments, the nanostructures 214 may be formed of any suitable material that may suitably collimate the other target spectrum L2 of the external light propagating through, for example, such as any suitable one of the example materials or a suitable combination thereof shown in FIG. 7, and/or the like. In some embodiments, the nanostructures 214 may include the same or substantially the same material as that of the nanostructures 114, but the present disclosure is not limited thereto, and in other embodiments, the nanostructures 214 may include a different material from that of the nanostructures 114. The nanostructures 214 will be described in more detail below with reference to FIGS. 3 through 8 and 10.

According to one or more example embodiments of the present disclosure, the optical devices 202, 104, and 204 for the hybrid thermal imaging device 200 may transmit and focus at least two different spectrums of external light to different sensing regions 216 and 218 of the hybrid thermal sensor 206 located at the same or different focal lengths from each other to detect different kinds of spectral information (e.g., different spectrums) from the external light. Thus, a hybrid thermal image may be generated from the different kinds of spectral information detected by the hybrid thermal sensor 206 from the external light at the same or substantially the same view-point from the same imaging device, rather than combining a thermal image captured from a thermal camera and separate image captured from a separate image camera. Accordingly, system costs and/or power consumption may be reduced, and latency may be reduced.

Figure 3A:
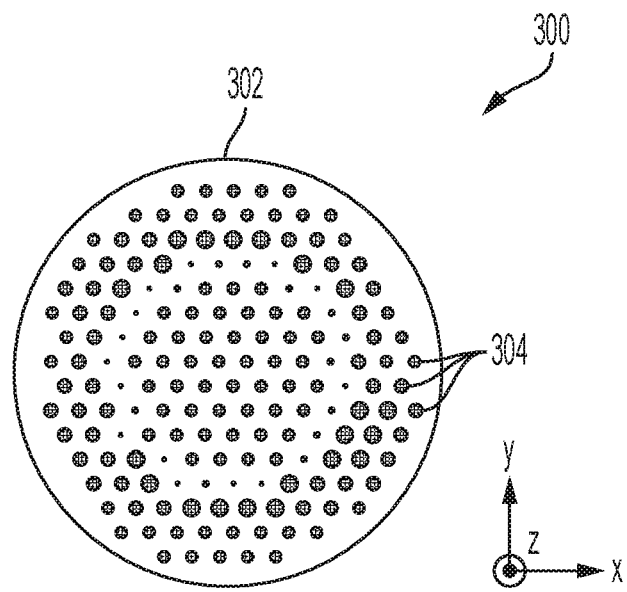
FIGS. 3A-3B illustrate a first target spectrum optical device according to one or more example embodiments of the present disclosure.
Figure 3B:
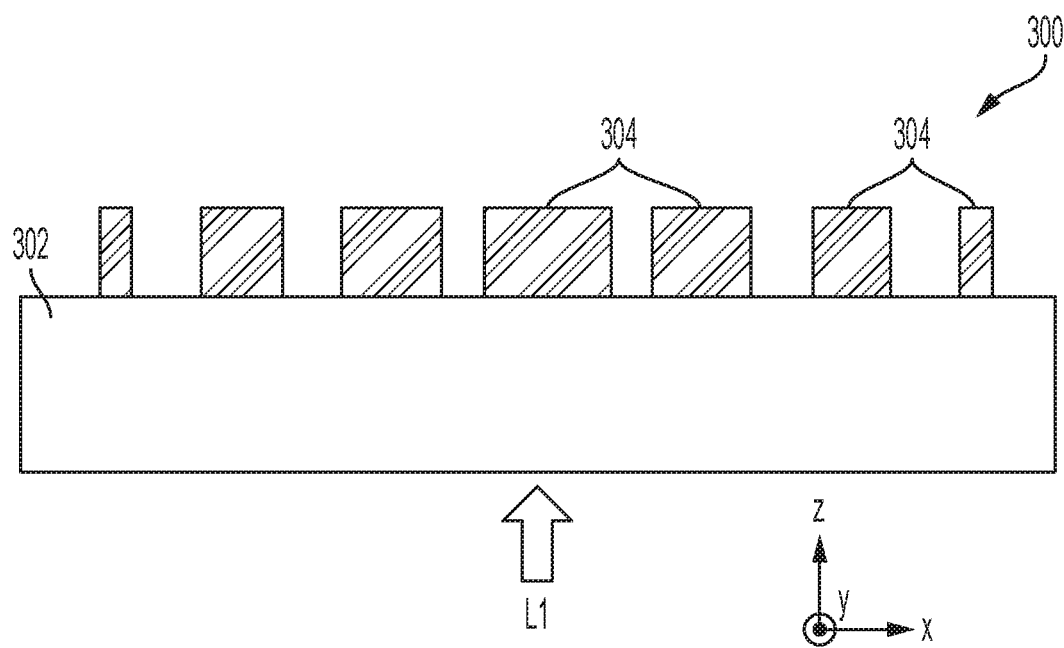
Figure 4A:
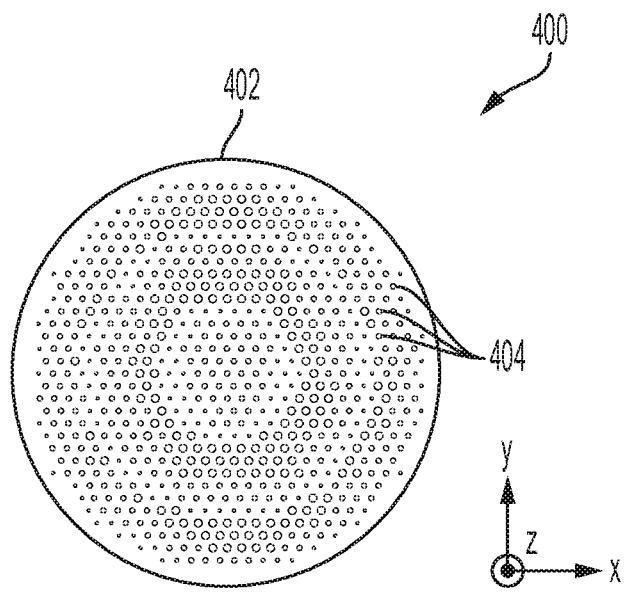
FIGS. 4A-4B illustrate a second target spectrum optical device according to one or more example embodiments of the present disclosure.
Figure 4B:
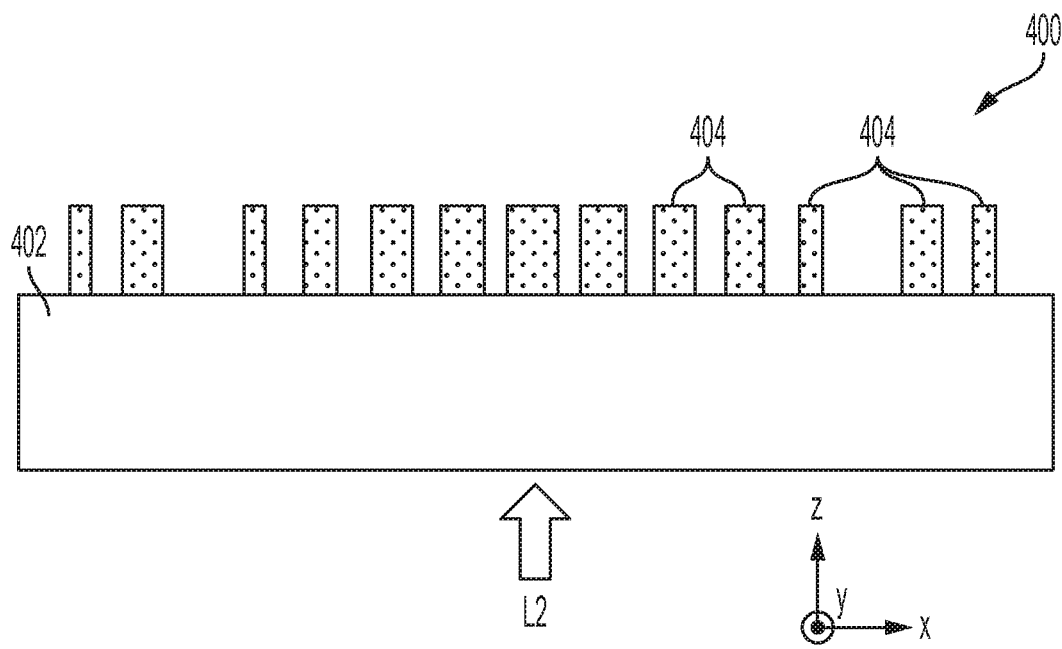
Figure 5A:
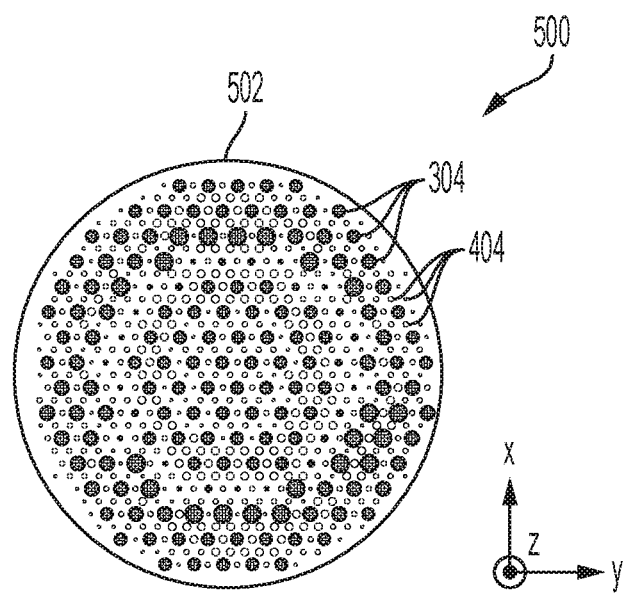
FIGS. 5A-5E illustrate a hybrid target spectrum optical device according to one or more example embodiments of the present disclosure.
Figure 5B:
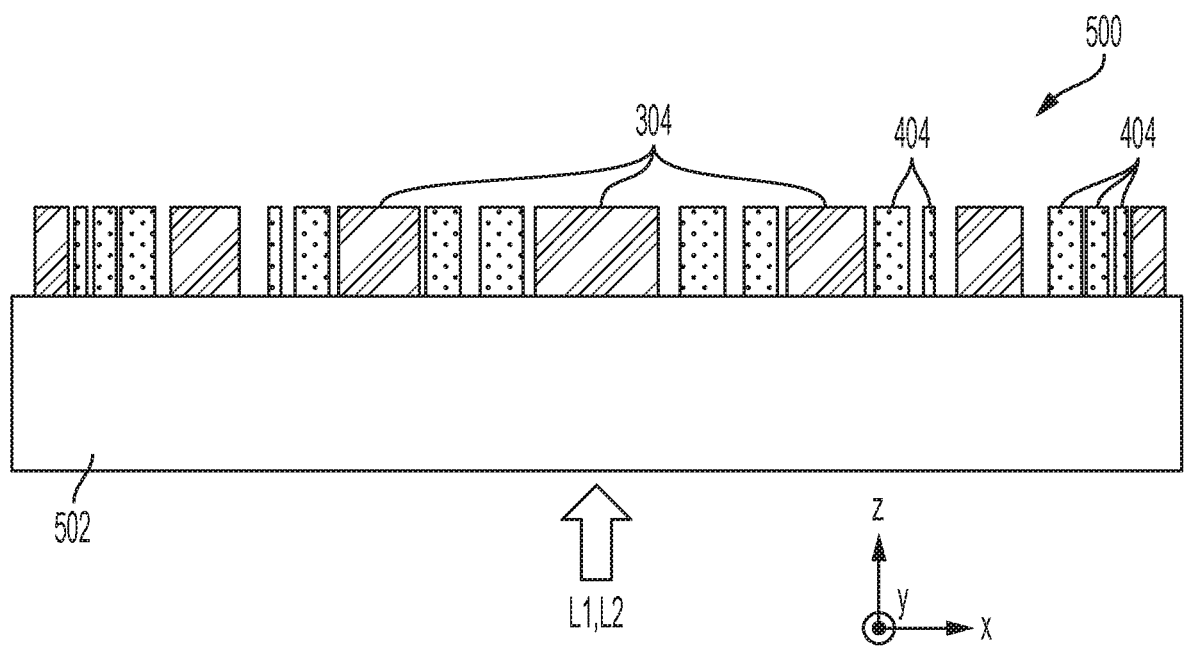
Figure 5C:
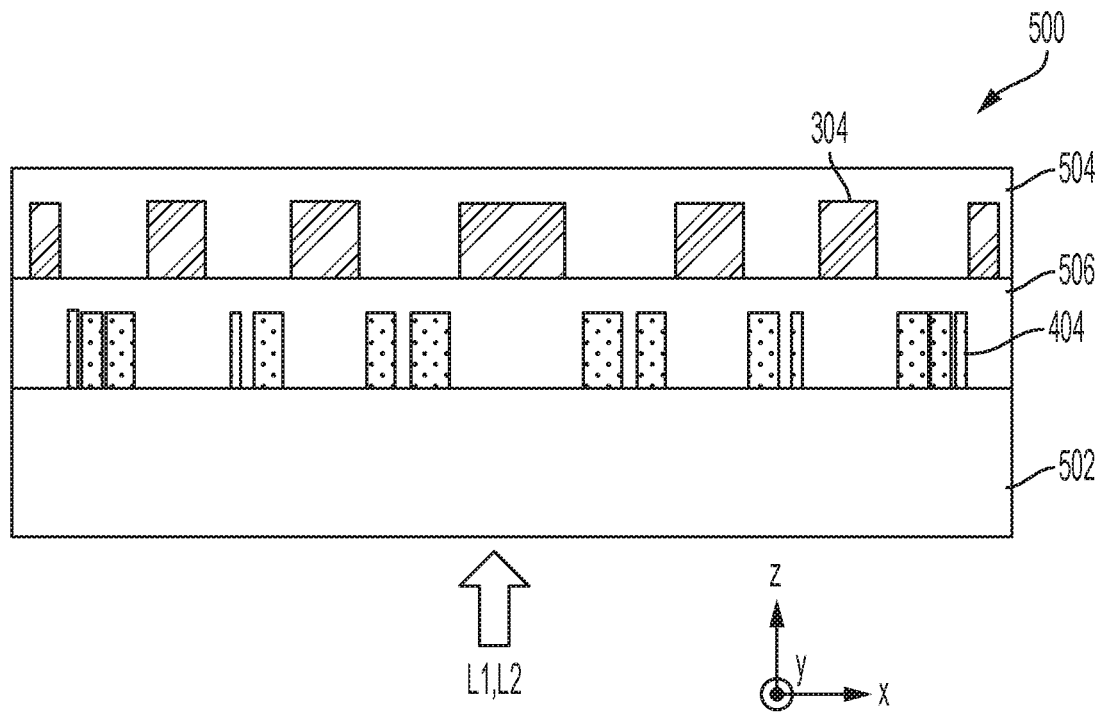
Figure 5D:
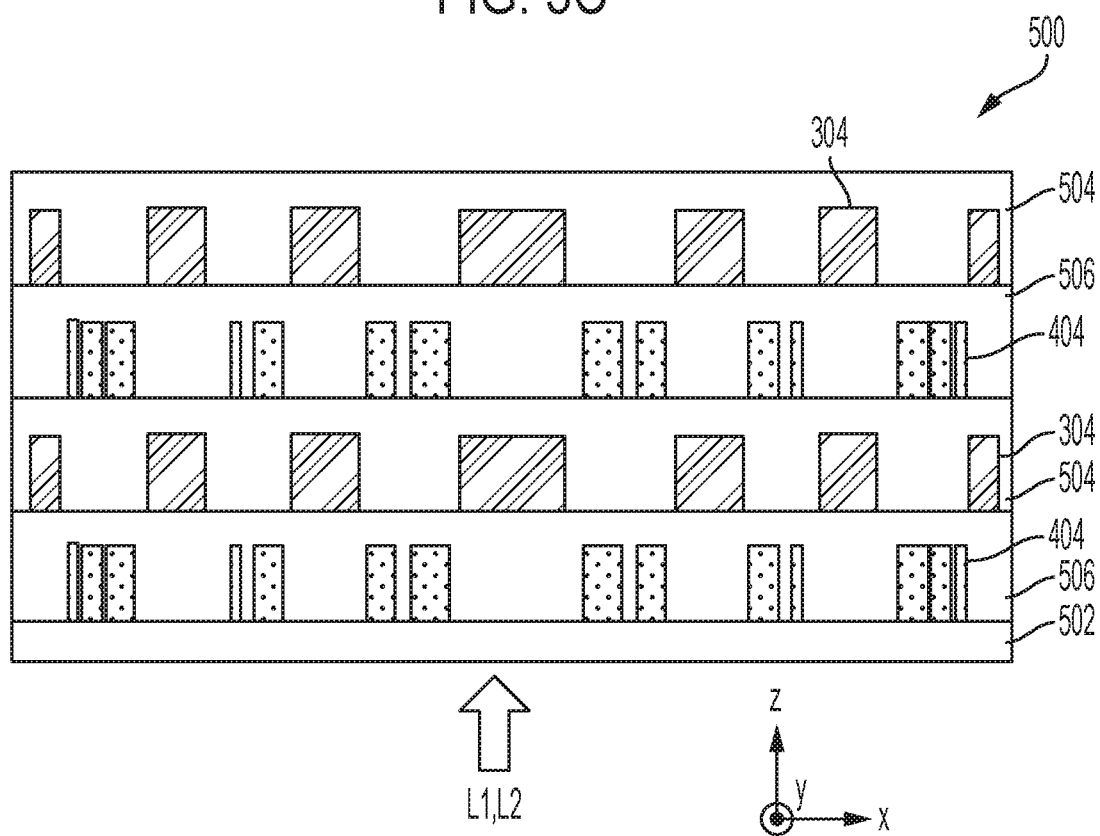
Figure 5E:
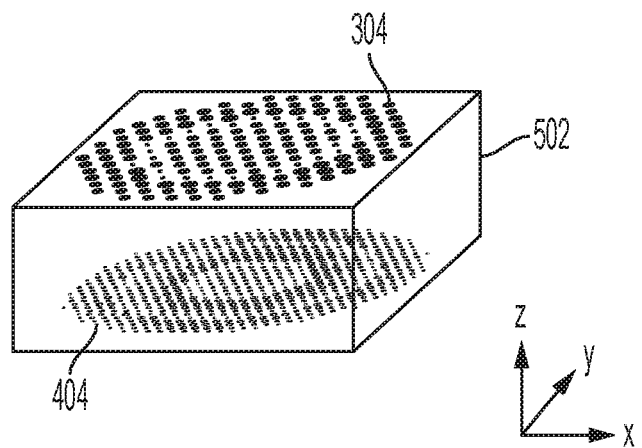

FIGS. 3A and 3B illustrate a first target spectrum optical device according to one or more example embodiments of the present disclosure. For example, FIG. 3A shows a plan view, and FIG. 3B shows a cross-sectional view of the first target spectrum optical device 300. FIGS. 4A and 4B illustrate a second target spectrum optical device according to one or more example embodiments of the present disclosure. For example, FIG. 4A shows a plan view, and FIG. 4B shows a cross-sectional view of the second target spectrum optical device 400. FIGS. 5A through 5E illustrate a hybrid target spectrum optical device according to one or more example embodiments of the present disclosure. For example, FIG. 5A shows a plan view, and FIGS. 5B through 5D show various example embodiments of a cross-sectional view of the hybrid target spectrum optical device 500. FIG. 5E shows an example embodiment of a perspective view of the hybrid target spectrum optical device 500.

According to one or more example embodiments of the present disclosure, the first target spectrum optical device 300 may be an optical device for a thermal sensor, for example, such as a global lens or a micro-lens of a thermal imaging device, that may transmit and focus (e.g., collimate) the target IR spectrum L1 of the external light to the thermal sensor or a thermal sensing region of a hybrid thermal sensor. The second target spectrum optical device 400 may be an optical device for an image sensor, for example, such as a global lens for an image sensor or a micro-lens corresponding to a visible-light sensing region of a hybrid thermal sensor, that may transmit and focus (e.g., collimate) the other target spectrum L2 of the external light to the image sensor or the visible-light sensing region of the hybrid thermal sensor. The hybrid target spectrum optical device 500 may be an optical device for a hybrid thermal sensor, for example, such as a global lens of a hybrid thermal imaging device or a micro-lens for one or more sensing regions of the hybrid thermal sensor, that may transmit and focus (e.g., collimate) at least both the target IR spectrum L1 and the other target spectrum L2 of external light to respective sensing regions of the hybrid thermal sensor (or to respective micro-lenses of the hybrid thermal sensor).

For example, in some embodiments, the first optical device 102 shown in FIG. 1 and/or the second optical device 104 shown in FIGS. 1, 2A, and 2B may have the same or substantially the same structure as that of the first target spectrum optical device 300 shown in FIGS. 3A and 3B, the third optical device 204 shown in FIGS. 2A and 2B may have the same or substantially the same structure as that of the second target spectrum optical device 400 shown in FIGS. 4A and 4B, and the first optical device 202 shown in FIGS. 2A and 2B may have the same or substantially the same structure as that of any suitable one of the hybrid target spectrum optical device 500 shown in FIGS. 5A through 5E. Accordingly, redundant description thereof may be simplified or may not be repeated. However, the present disclosure is not limited thereto, and any of the first, second, and third optical devices 102, 202, 104, and 204 may have the same or substantially the same structure as any suitable one of the optical devices 300, 400, and 500 shown in FIGS. 3A through 5E depending on the desired application, implementation, arrangement, structure, and/or the like of the imaging device.

According to one or more example embodiments of the present disclosure, each of the first target spectrum optical device 300, the second target spectrum optical device 400, and the hybrid target spectrum optical device 500 may include a transparent substrate 302, 402, or 502. Each of the substrates 302, 402, and 502 may be a flexible substrate or a rigid substrate, and may be flat or substantially flat. However, the present disclosure is not limited thereto, and in some embodiments, any of the substrates 302, 402, and/or 502 may have a suitable curvature depending on the characteristics, material, application, and/or structure thereof. While FIGS. 3A, 4A, and 5A illustrate that the substrates 302, 402, and 502 may have a circular shape in a plan view (e.g., a view from the z-axis direction), the present disclosure is not limited thereto, and each of the substrates 302, 402, and 502 may have any suitable shape in the plan view, for example, such as an elliptical shape, a triangular shape, a quadrilateral shape, a pentagon shape, a hexagon shape, an oblong shape, and/or the like.

The substrates 302, 402, and 502 may each include (e.g., may each be made of) a suitable transparent material to transmit at least their respective target spectrums L1 and L2 of external light. For example, the substrate 302 of the first target spectrum optical device 300 may include a suitable IR transparent material to allow at least the target IR spectrum L1 (e.g., a range between about 8 µm to about 12 µm) to be transmitted through, the substrate 402 of the second target spectrum optical device 300 may include a suitable visible-light transparent material to allow at least the other target spectrum L2 (e.g., any suitable range between about 0.4 µm and about 2.5 µm) to be transmitted through, and the substrate 502 of the hybrid target spectrum optical device 500 may include a suitable IR transparent material to allow at least both the target IR spectrum L1 and the other target spectrum L2 to be transmitted through.

In various embodiments, the substrates 302, 402, and 502 may include the same or substantially the same material as each other, or at least one of the substrates 302, 402, and 502 may include one or more different materials from those of the others. For example, in some embodiments, the substrates 302, 402, and 502 may each include (e.g., may each be made of) calcium fluoride (CaF2). However, the present disclosure is not limited thereto, and in other embodiments, the substrates 302, 402, and 502 may each include any suitable material that may transmit their respective target spectrums L1 and L2 through, for example, such as polymers, Si (a-Si, c-SI, p-Si), barium fluoride (BaF2), potassium bromide (KBr), potassium chloride (KCl), sodium chloride (NaCl), and/or the like, or a combination thereof.

The first target spectrum optical device 300 may include a plurality of first nanostructures 304 that are disposed on the substrate 302 to be spaced apart from each other, and the second target spectrum optical device 400 may include the plurality of second nanostructures 404 that are disposed on the substrate 402 to be spaced apart from each other. The hybrid target spectrum optical device 500 may include both the plurality of first nanostructures 304 and the plurality of second nanostructures 404 that are disposed on the substrate 502 to be spaced apart from each other. For example, each of the substrates 302, 402, and 502 may have an external surface that faces the external light (e.g., L1 and L2), and an internal surface that faces a sensor (e.g., an image sensor, a thermal sensor, a hybrid thermal sensor, and/or the like) of the imaging device. In some embodiments, respective ones of the first and second nanostructures 304 and 404 may be disposed on the internal surface of the substrates 302, 402, and 502 to be spaced apart from each other, and may extend towards the sensor in a thickness direction (e.g., a z-axis direction).

In other embodiments, as shown in FIG. 5E, the substrate 502 may include a first surface and a second surface. The first and second surfaces may be opposite surfaces (e.g., in the z-axis direction), such that the first and second surfaces may face away from each other. In some embodiments, the plurality of first nanostructures 304 may be disposed on the first surface of the substrate 502 to be spaced apart from each other, and the plurality of second nanostructures 404 may be disposed on the second surface of the substrate 502 to be spaced apart from each other. In some embodiments, the first nanostructures 304 may not overlap with the second nanostructures 404 in the thickness direction (e.g., in the z-axis direction).

For example, in some embodiments, as shown in FIGS. 3A and 3B, the first target spectrum optical device 300 may include the first nanostructures 304 arranged on the internal surface of the substrate 302 along a first direction (e.g., an x-axis direction) and a second direction (e.g., a y-axis direction) in which the substrate 302 extends. The first nanostructures 304 may be spaced apart from each other, and may each extend in the thickness direction (e.g., the z-axis direction). The first nanostructures 304 may have various suitable geometric shapes, sizes, and/or arrangements to sufficiently focus (e.g., to sufficiently collimate) the target IR spectrum L1 propagating therethrough on a desired spatial location (e.g., on a desired thermal sensor or a desired sensing region of the thermal sensor). While FIG. 3B illustrates that the first nanostructures 304 of the first target spectrum optical device 300 has a single layer structure, the present disclosure is not limited thereto, and in some embodiments, the first nanostructures 304 of the first target spectrum optical device 300 may have a multi-layered structure. In this case, for example, in some embodiments, the first target spectrum optical device 300 may have multiple layers of the first nanostructures 304.

In another example, in some embodiments, as shown in FIGS. 4A and 4B, the second target spectrum optical device 400 may include the second nanostructures 404 arranged on the internal surface of the substrate 402 along a first direction (e.g., an x-axis direction) and a second direction (e.g., a y-axis direction) in which the substrate 402 extends. The second nanostructures 404 may be spaced apart from each other, and may each extend in the thickness direction (e.g., the z-axis direction). The second nanostructures 404 may have various suitable geometric shapes, sizes, and/or arrangements to sufficiently focus (e.g., to sufficiently collimate) the other target spectrum L2 propagating therethrough on a desired spatial location (e.g., on a desired sensor or a desired sensing region of the sensor). While FIG. 4B illustrates that the second nanostructures 404 of the second target spectrum optical device 400 has a single layer structure, the present disclosure is not limited thereto, and in some embodiments, the second nanostructures 404 of the second target spectrum optical device 400 may have a multi-layered structure. In this case, for example, in some embodiments, the second target spectrum optical device 400 may have multiple layers of the second nanostructures 404.

In still another example, in some embodiments, as shown in FIGS. 5A through 5D, the hybrid target spectrum optical device 500 may include the first nanostructures 304 arranged on the internal surface of the substrate 502 along a first direction (e.g., an x-axis direction) and a second direction (e.g., a y-axis direction) in which the substrate 502 extends, and the second nanostructures 404 arranged on the internal surface of the substrate 502 along the first direction and the second direction. The first and second nanostructures 402 and 404 may be spaced apart from each other, and may each extend in the thickness direction (e.g., the z-axis direction). The first and second nanostructures 402 and 404 may have various suitable geometric shapes, sizes, and/or arrangements to sufficiently focus (e.g., to sufficiently collimate) their respective target spectrums L1 and L2 on desired spatial locations (e.g., respective sensing regions of a hybrid thermal sensor). In some embodiments, the first and second nanostructures 304 and 404 may be spaced apart from each other, and/or may be arranged to not overlap with each other in the thickness direction (e.g., the z-axis direction), but the present disclosure is not limited thereto.

In another example, in some embodiments, as shown in FIG. 5E, the hybrid target spectrum optical device 500 may include the first nanostructures 304 arranged on the first surface of the substrate 502, and the second nanostructures 404 arranged on the second surface of the substrate 502. In this case, the first and second nanostructures 304 and 404 may extend away from each other in the thickness direction (e.g., the z-axis direction) of the substrate 502. The first nanostructures 304 may include one or more layers that are stacked on the first surface of the substrate 502, and the second nanostructures 404 may include one or more layers that are stacked on the second surface of the substrate 502. In some embodiments, the first and second nanostructures 304 and 404 may be spaced apart from each other, and/or may be arranged to not overlap with each other in the thickness direction (e.g., the z-axis direction), but the present disclosure is not limited thereto.

In some embodiments, the first and second nanostructures 304 and 404 may be interleaved with each other in a plan view as shown in FIG. 5A, such that each of the first and second nanostructures 304 and 404 are arranged across an entirety of the substrate 502 in the plan view. In this case, a resolution of the hybrid thermal image detected by the hybrid thermal sensor 206 may be improved, and post image processing may be reduced. However, the present disclosure is not limited thereto, and the first and second nanostructures 304 and 404 may be arranged across respective multisector regions of the substrate 502 in a plan view, for example, in a checker board shape, a stripe shape, a cross shape, and/or the like, which will be described in more detail with reference to FIGS. 10A and 10B.

In some embodiments, as shown in FIG. 5B, the first and second nanostructures 304 and 404 of the hybrid target spectrum optical device 500 may have a single layer structure. In other words, in some embodiments, the hybrid target spectrum optical device 500 may have a single layer structure of the first and second nanostructures 304 and 404. In this case, in some embodiments, the first and second nanostructures 304 and 404 may be spaced apart from each other in the first and second directions (e.g., the x-axis and y-axis direction) on the substrate 502. In some embodiments, one or more of the plurality of second nanostructures 404 may be arranged between two adjacent first nanostructures 302 (e.g., in the x-axis direction and/or the y-axis direction), but the present disclosure is not limited thereto.

In other embodiments, as shown in FIGS. 5C and 5D, the first and second nanostructures 304 and 404 of the hybrid target spectrum optical device 500 may have a multi-layered structure. In other words, in some embodiments, the hybrid target spectrum optical device 500 may have a multi-layered structure of the first and second nanostructures 304 and 404. For example, in some embodiments, the hybrid target spectrum optical device 500 may include one or more first layers 504 including the first nanostructures 304, and one or more second layers 506 including the second nanostructures 404. The one or more first layers 504 and the one or more second layers 506 may be stacked on each other. For example, in some embodiments, the one or more first layers 504 may be alternately stacked with the one or more second layers 506, but the present disclosure is not limited thereto. While FIGS. 5C and 5D show that a number of the first layers 504 may be the same as a number of the second layers 506, the present disclosure is not limited thereto, and the number of the first layers 504 may be different from that of the second layers 506. In still other embodiments, as shown in FIG. 5E, the hybrid target spectrum optical device 500 may include one or more layers of the first nanostructures 304 on (e.g., stacked on) the first surface of the substrate 502, and one or more layers of the second nanostructures 404 on (e.g., stacked on) the second surface of the substrate 502 facing away from the first surface.

In some embodiments, when the first and second nanostructures 304 and 404 have the multi-layered structure, the first nanostructures 304 and the second nanostructures 404 may not overlap with each other in the thickness direction (e.g., the z-axis direction). In this case, in some embodiments, the first nanostructures 304 of two different first layers 504 may at least partially overlap with each other in the thickness direction, and the second nanostructures 404 of two different second layers 506 may at least partially overlap with each other in the thickness direction. However, the present disclosure is not limited thereto, for example, in some embodiments, some of the first nanostructures 304 and some of the second nanostructures 404 may at least partially overlap with each other in the thickness direction. In some embodiments, one or more of the plurality of second nanostructures 404 may be arranged between two adjacent first nanostructures 302 in a plan view (e.g., a view from the z-axis direction), but the present disclosure is not limited thereto.

In some embodiments, the first nanostructures 304 may have various suitable geometric shapes and/or sizes (e.g., dimensions) to sufficiently focus (e.g., to sufficiently collimate) the target IR spectrum L1 propagating through, and the second nanostructures 404 may have various suitable geometric shapes and/or sizes (e.g., dimensions) to sufficiently focus (e.g., to sufficiently collimate) the other target spectrum L2 propagating through. In some embodiments, the geometric shape of the first nanostructures 304 may be the same or substantially the same as those of the second nanostructures 404, or the geometric shape of one or more of the first nanostructures 304 may be different from those of one or more of the second nanostructures 404.

In some embodiments, the first nanostructures 304 may have the same or substantially the same geometric shape as each other, but the present disclosure is not limited thereto, and at least one of the first nanostructures 304 may have a different geometric shape from that of at least one of the others. In some embodiments, at least some of the first nanostructures 304 may have a different size (e.g., a different height and/or a different width) from those of some of the others. In some embodiments, the second nanostructures 404 may have the same or substantially the same geometric shape as each other, but the present disclosure is not limited thereto, and at least one of the second nanostructures 404 may have a different geometric shape from that of at least one of the others. In some embodiments, at least some of the second nanostructures 404 may have a different size (e.g., a different height and/or a different width) from those of some of the others.

For example, in some embodiments, the first nanostructures 304 and the second nanostructures 404 may each have a cylindrical shape with various different sizes (e.g., various different widths, heights, and/or the like), but the present disclosure is not limited thereto. For example, in other embodiments, the first nanostructures 304 and the second nanostructures 404 may each have any suitable geometric shape, for example, such as a square or rectangular shape, a spherical, ellipsoidal or semi-spherical shape, a cuboid shape, a cone shape, a prism shape, a pyramid shape, an irregular shape, and/or the like. In some embodiments, the first nanostructures 304 may generally have a larger size (e.g., a larger width or a larger diameter) than those of the second nanostructures 404, for example, as shown in FIGS. 3 through 5, in order to sufficiently shift a phase of the relevant wavelengths in the LWIR spectrum, but the present disclosure is not limited thereto. For example, in order to change a phase of the longer wavelengths in the LWIR spectrum L1 than those of the other target spectrum L2, the first nanostructures 304 may generally have a larger width and/or height than corresponding ones of the adjacent second nanostructures 304, but the present disclosure is not limited thereto.

For example, according to some embodiments, the geometric shape and/or sizes (e.g., widths and/or heights) of the first and second nanostructures 304 and 404 may depend on a material used to form the nanostructure and/or corresponding substrate, a target wavelength of the external light to be focused, a focal length of the sensor or sensor region (or micro-lens) from the corresponding optical device, a spatial location of the nanostructure on the substrate, and/or the like. For example, the geometric shapes and/or sizes of each of the first and second nanostructures 304 and 404 may depend on a desired shift amount of the phase of the relevant wavelengths of the respective target spectrums L1 and L2 of the external light propagating through, such that the relevant wavelengths may be suitably focused (e.g., may be suitably collimated) on a desired spatial location (e.g., corresponding to the sensor, the sensor regions, the micro-lenses, and/or the like).

In some embodiments, the first nanostructures 304 may be made of the same or substantially the same material as that of the second nanostructures 404, or may be made of a different material as that of the second nanostructures 404. As a non-limiting example, in some embodiments, each of the first and second nanostructures 304 and 404 may be formed of a-Si. As another non-limiting example, in some embodiments, the first nanostructures 304 may be formed of a-Si and the second nanostructures 404 may be formed of $TiO_2$. In some embodiments, the first nanostructures 304 may have the same thickness (e.g., the same height in the z-axis direction) as that of the second nanostructures 404. As a non-limiting example, in some embodiments, each of the first and second nanostructures 304 and 404 may have a height (e.g., in the z-axis direction) that is greater than or equal to about 5 μm (e.g., that is greater than or equal to 5 μm). In other embodiments, the first nanostructures 304 may have a different thickness (e.g., a different height in the z-axis direction) as that of the second nanostructures 404. For example, in some embodiments, each of the first and second nanostructures 304 and 404 may have a height (e.g., in the z-axis direction) corresponding to a target wavelength of light focused by the corresponding nanostructure. As a non-limiting example, in some embodiments, the first nanostructures 304 may have a height (e.g., in the z-axis direction) that is greater than or equal to about 5 μm (e.g., that is greater than or equal to 5 μm), and the second nanostructures 404 may have a height (e.g., in the z-axis direction) that is less than those of the first nanostructures 304, for example, such as in a range between about 350 nm to about 750 nm (e.g., in a range between 350 nm and 750 nm). However, the present disclosure is not limited to the non-limiting examples provided herein.

In some embodiments, when the first and second nanostructures 304 and 404 are formed to have the single-layer structure, for example, as shown in FIG. 5B, it may be difficult to form the first nanostructures 304 from a different material from that of the second nanostructures 404, and/or to form the first nanostructures 404 to have a different thickness (e.g., a different height in the z-axis direction) from that of the second nanostructures 404. Accordingly, in some embodiments, the multi-layer structure of the first and second nanostructures 304 and 404, for example, as shown in FIGS. 5C through 5E, may enable the first nanostructures 304 to be formed from a different material from that of the second nanostructures 404, and/or to be formed to have different heights (e.g., different thicknesses in the z-axis direction) from that of the second nanostructures 404. However, the present disclosure is not limited thereto, and in some embodiments, the first and second nanostructures 304 and 404 of the single-layer structure (e.g., see FIG. 5B) may be formed from different materials and/or to have different heights from each other.

Figure 8A:
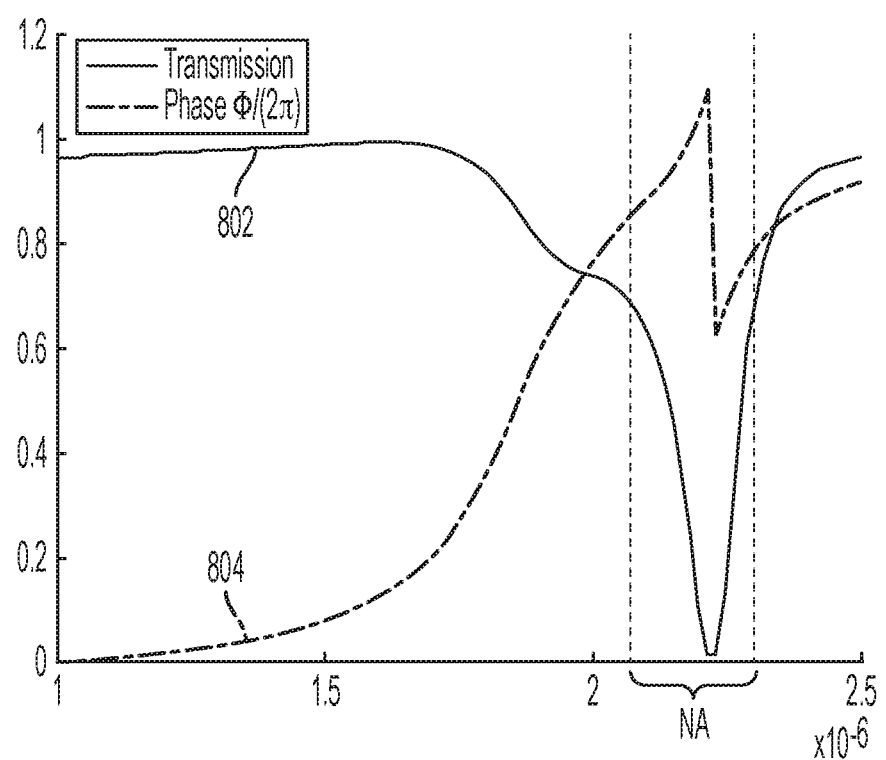
FIGS. 8A-8B are graphs illustrating a relationship between the transmission and phase of light and a diameter of a nanostructure of the optical device according to one or more example embodiments of the present disclosure.
Figure 8B:
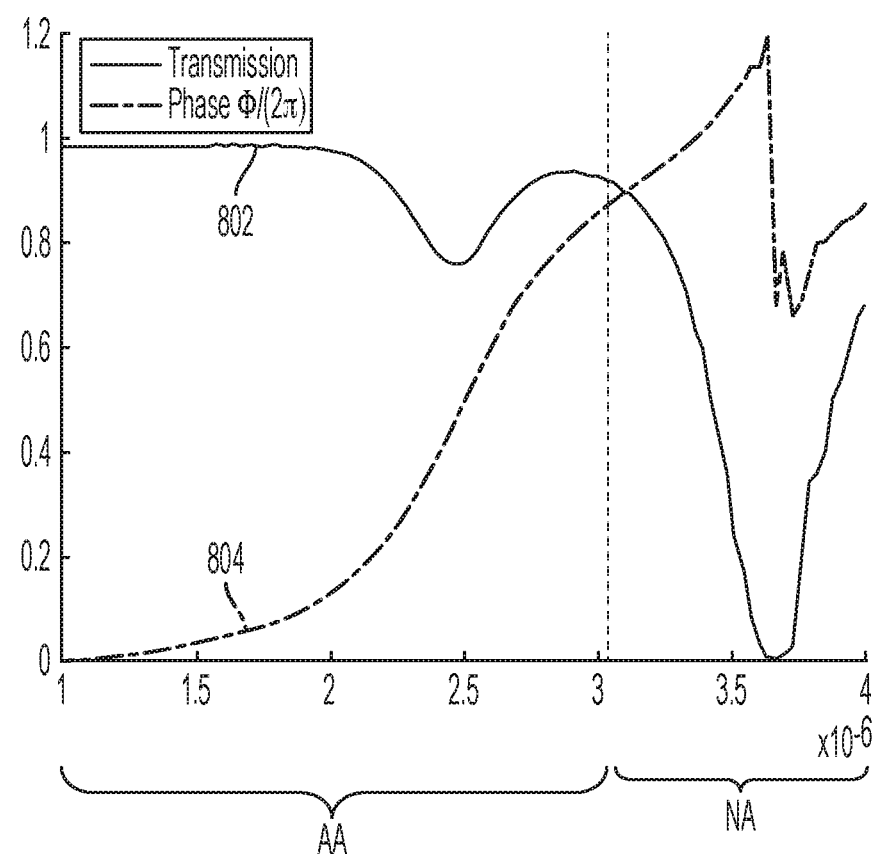

FIG. 6 is a table showing a list of example suitable materials for a substrate of the optical device according to one or more example embodiments of the present disclosure, and FIG. 7 is a table showing a list of example suitable materials for a nanostructure of the optical device according to one or more example embodiments of the present disclosure. FIGS. 8A and 8B are graphs illustrating a relationship between the transmission and phase of light and a diameter of a nanostructure of the optical device according to one or more example embodiments of the present disclosure.

Referring to FIG. 6, a suitable transparent material for the substrate may sufficiently transmit the relevant wavelengths of the target spectrum (e.g., L1 and/or L2) of the external light through. For example, in some embodiments, the substrate of the optical device according to one or more example embodiments of the present disclosure may include calcium fluoride CaF2, but the present disclosure is not limited thereto. Referring to FIG. 7, a suitable material for the nanostructures may sufficiently transmit the relevant wavelengths of the target spectrum (L1 and/or L2) of the external light through. For example, in some embodiments, the nanostructures of the optical device according to one or more example embodiments of the present disclosure may include amorphous silicon (a-Si) or other suitable dielectric material, for example, such as c-Si, p-Si, Ge, GaAs, ZnS, ZnSe, $Si_3N_4$, $TiO_2$, $HfO_2$, and/or the like, but the present disclosure is not limited thereto. In some embodiments, the first nanostructures 304 and the second nanostructures 404 may include the same material (e.g., a-Si) as each other. In other embodiments, the first nanostructures 304 may include a different material from that of the second nanostructures 404. For example, in some embodiments, the first nanostructures 304 may be formed of, for example, a-Si, and the second nanostructures 404 may be formed of, for example, $TiO_2$, but the present disclosure is not limited thereto.

Referring to FIG. 8A, the graph illustrates a relationship between the transmission 802 and phase 804 of light for various different widths (e.g., diameters) of a nanostructure including amorphous silicon (a-Si). The graph of FIG. 8A assumes that the substrate includes potassium bromide (KBr), and the nanostructure has a cylindrical shape with a height (e.g., in the z-axis direction) of about 4 μm. A square lattice having a lattice constant (e.g., pixel size) of about 5 μm and a light having a target wavelength of 10 μm was used to simulate the graph of FIG. 8A.

As shown in FIG. 8A, a 2π phase shift of the target wavelength of light may be generated as the diameter (e.g., as represented by the X-axis) of the nanostructure is increased. For example, FIG. 8A illustrates that transmission 802 is greater than about 95% in 80% of 2π phases 804 achieved, which may be suitable for low numerical apertures (NA) applications, and that transmission 802 is greater than about 70% in all phases 804 achieved, which may be suitable for high NA applications. However, transmission 802 through the nanostructure may be unsuitably decreased when the diameter of the nanostructure is too large. Thus, according to one or more example embodiments of the present disclosure, the diameter of the nanostructure may be selected according to a desired transmission 802 and phase 804 shown in the graph of FIG. 8A, but the diameters corresponding to a non-applicable area NA of the graph may be avoided to prevent or substantially prevent low transmission.

Referring to FIG. 8B, the graph illustrates a relationship between the transmission 802 and phase 804 of light for various different widths (e.g., diameters) of a nanostructure including amorphous silicon (a-Si). The graph of FIG. 8B assumes that the substrate includes calcium fluoride (CaF2), and the nanostructure has a cylindrical shape with a height (e.g., in the z-axis direction) of about 5 μm. A square lattice having a lattice constant of about 5 μm and a light having a target wavelength of 10 μm was used to simulate the graph of FIG. 8B.

As shown in FIG. 8B, a 2π phase shift of the target wavelength of light may be generated as the diameter (e.g., as represented by the X-axis) of the nanostructure is increased within an applicable area AA of the graph. However, transmission 802 through the nanostructure may be unsuitably decreased when the diameter of the nanostructure is too large. Thus, according to one or more example embodiments of the present disclosure, the diameter of the nanostructure may be selected according to a desired transmission 802 and phase 804 shown in the graph of FIG. 8B, but larger diameters of the nanostructure outside of the applicable area AA of the graph may be avoided to prevent or substantially prevent low transmission. For example, in some embodiments, the nanostructures for transmitting and focusing the IR target spectrum L1 may have different widths in a range between about 1 μm and 3.1 μm, but the present disclosure is not limited thereto.

In some embodiments, the height of the nanostructures may vary in order to vary the performance, but may be challenging to fabricate as discussed above. For example, in some embodiments, the first nanostructures 304 may have a thickness (e.g., in the z-axis direction) of at least 5 μm for a complete 2π phase shift with high transmission of a 10 μm wavelength of the IR target spectrum L1, whereas when the second nanostructures 404 have the thickness of 5 μm, the second nanostructures 404 may exhibit multiple cycles of 2π phase shifts with variable transmission of a 600 nm wavelength of the other target spectrum L2. Accordingly, in some embodiments, the first nanostructures 304 and the second nanostructures 404 may be formed at different layers from each other (e.g., see FIGS. 5C-5E), such that the material and/or the height of the first and second nanostructures 304 and 404 may be variously formed.

Figure 10A:
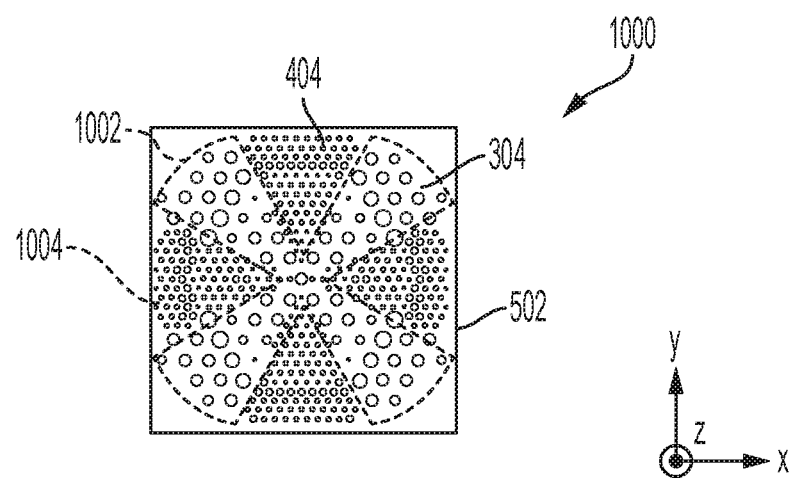
FIGS. 10A-10B illustrate a hybrid target spectrum optical device according to one or more example embodiments of the present disclosure.
Figure 10B:
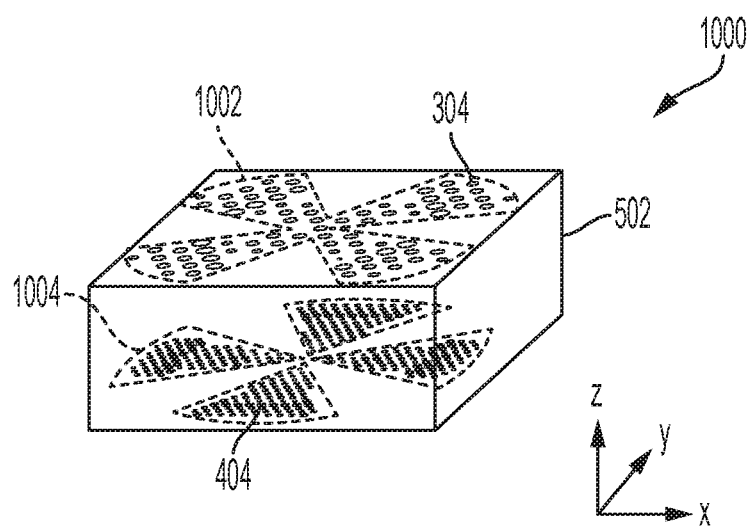

FIGS. 10A and 10B illustrate a hybrid target spectrum optical device according to one or more example embodiments of the present disclosure. For example, FIG. 10A shows a plan view and FIG. 10B shows a perspective view of the hybrid target spectrum optical device 1000. The hybrid target spectrum optical device 1000 of FIG. 10 may be the same or substantially the same as the hybrid target spectrum optical device 500 of FIG. 5, except for an arrangement of the first and second nanostructures 304 and 404, and thus, redundant description thereof may not be repeated or may be simplified. While FIG. 10B shows that the first and second nanostructures 304 and 404 are arranged on opposite surfaces of the substrate 502, the present disclosure is not limited thereto, and the first and second nanostructures 304 and 404 may be arranged as a single layer (e.g., see FIG. 5B), or as multiple layers that are stacked on one another (e.g., see FIGS. 5C and 5D).

Referring to FIGS. 10A and 10B, in some embodiments, each of the first and second nanostructures 304 and 404 may be arranged at respective multisector regions on the substrate 502. For example, the first nanostructures 304 may be arranged across a first multisector region 1002, and the second nanostructures 404 may be arranged across a second multisector region 1004. In this case, the first and second multisector regions 1002 and 1004 may not overlap with each other in a plan view, and thus, a plurality of the first nanostructures 304 of the first multisector region 1002 may not overlap with a plurality of second nanostructures 404 of the second multisector region 1004 in a plan view. For example, rather than the first and second nanostructures 304 and 404 being interleaved with each other across an entirety of the substrate 502, the first and second nanostructures 304 and 404 may be arranged only at their respective first and second multisector regions 1002 and 1004.

In some embodiments, the first nanostructures 304 arranged at the first multisector region 1002 and the second nanostructures 404 arranged at the second multisector region 1004 may be formed of different materials from each other.

For a non-limiting example, in some embodiments, the first nanostructures 304 arranged at the first multisector region 1002 may be formed of a-Si, and the second nanostructures 404 arranged at the second multisector region 1004 may be formed of $TiO_2$. In this case, the first nanostructures 304 may have a different width and/or a different height from that of the second nanostructures 404. For example, in some embodiments, the first nanostructures 304 may have a height (e.g., in the z-axis direction) that is greater than or equal to about 5 μm, and the second nanostructures 404 may have a height (e.g., in the z-axis direction) that is between about 200 nm and about 700 nm. For example, in some embodiments, the first nanostructures 304 may have a width (e.g., in the x-axis or y-axis direction) that is less than or equal to about 3 μm and the second nanostructures 404 may have a width (e.g., in the x-axis or y-axis direction) that is less than or equal to about 350 nm. In some embodiments, increasing the height (e.g., in the z-axis direction) of the first nanostructures 304 may improve performance. For example, in some embodiments, increasing the height of the first nanostructures 304 from 5 μm to 6 μm may increase transmission from about 41% to about 49%, and may increase a field effect from about 34% to about 44%.

While FIGS. 10A and 10B show that each of the first and second multisector regions 1002 and 1004 have a cross shape in a plan view, the present disclosure is not limited thereto, and the first and second regions 1002 and 1004 may have any suitable shape, for example, such as a stripe shape, a checker board shape, and/or the like. In the case of the checker board shape, each of the first multisector regions 1002 of the checker board shape may include a plurality of the first nanostructures 204, each of the second multisector regions 1004 of the checker board shape may include a plurality of the second nanostructures 204, and the plurality of the first and second nanostructures 304 and 404 of each of the first and second regions 1002 and 1004 may not overlap with each other. In some embodiments, depending on a shape or an arrangement of the first and second multisector regions 1002 and 1004, a resolution of the hybrid thermal image may be improved. For example, in some embodiments, the checker board shape may be arranged to have better coverage than that of the cross shape shown in FIGS. 10A and 10B, and thus, may have a 30% improvement in resolution.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. An imaging device comprising:
a sensor configured to detect a first target spectrum, the first target spectrum corresponding to a thermal imaging region of an infrared (IR) spectrum; and
an optical device configured to transmit external light to the sensor, the optical device comprising:
a substrate; and
a plurality of nanostructures on the substrate, and configured to collimate at least the first target spectrum in the external light on the sensor,
wherein the plurality of nanostructures are spaced apart from each other, and at least one of the plurality of nanostructures has a different geometric size from that of another, and
wherein the plurality of nanostructures comprise:
a plurality of first nanostructures comprising a material to transmit the first target spectrum of the external light through, and configured to collimate the first target spectrum of the external light on a first sensing region of the sensor, the plurality of first nanostructures comprising a first-first nanostructure, and a first-second nanostructure adjacent to and spaced apart from the first-first nanostructure; and
at least one second nanostructure comprising a material to transmit a second target spectrum of the external light through, and configured to collimate the second target spectrum of the external light on a second sensing region of the sensor, the at least one second nanostructure being located between and spaced apart from the first-first nanostructure and the first-second nanostructure in a plan view,
wherein the first target spectrum is in a range between 8 μm and 12 μm, and the second target spectrum is in a range between 0.4 μm and 2.5 μm,
wherein the substrate includes a first multisector region and a second multisector region that do not overlap with each other in the plan view, and
wherein the first nanostructures are arranged at the first multisector region, and the at least one second nanostructure is arranged at the second multisector region.

2. The imaging device of claim 1, wherein the substrate includes calcium fluoride, and the plurality of nanostructures includes a high-index dielectric material.

3. The imaging device of claim 2, wherein the nanostructures have a cylindrical or square shape.

4. The imaging device of claim 1, wherein the plurality of nanostructures further comprise a plurality of second nanostructures configured to collimate the second target spectrum of the external light on the second sensing region of the sensor, the plurality of second nanostructures comprising the at least one second nanostructure.

5. The imaging device of claim 4, wherein the first nanostructures and the second nanostructures are arranged at the same surface of the substrate.

6. The imaging device of claim 4, wherein the first nanostructures and the second nanostructures are arranged at opposite surfaces of the substrate from each other.

7. The imaging device of claim 4, wherein at least one of the first nanostructures has a larger geometric shape than those of the second nanostructures.

8. The imaging device of claim 4 the second nanostructures are arranged at the second multisector region.

9. An optical device comprising:
a substrate; and
a plurality of nanostructures spaced apart on the substrate, and configured to collimate at least a first target spectrum of external light on a sensor, the first target spectrum corresponding to a thermal imaging region of an infrared (IR) spectrum,
wherein at least one of the nanostructures have a different geometric size from that of another, and
wherein the plurality of nanostructures comprise:
a plurality of first nanostructures comprising a material to transmit the first target spectrum of the external light through, and configured to collimate the first target spectrum of the external light on a first sensing region of the sensor, the plurality of first nanostructures comprising a first-first nanostructure, and a first-second nanostructure adjacent to and spaced apart from the first-first nanostructure; and
at least one second nanostructure comprising a material to transmit a second target spectrum of the external light through, and configured to collimate the second target spectrum of the external light on a second sensing region of the sensor, the at least one second nanostructure being located between and spaced apart from the first-first nanostructure and the first-second nanostructure in a plan view,
wherein the first target spectrum is in a range between 8 μm and 12 μm, and the second target spectrum is in a range between 0.4 μm and 2.5 μm,
wherein the substrate includes a first multisector region and a second multisector region that do not overlap with each other in the plan view, and
wherein the first nanostructures are arranged at the first multisector region, and the at least one second nanostructure is arranged at the second multisector region.

10. The optical device of claim 9, wherein the substrate includes calcium fluoride, and the plurality of nanostructures include silicon or amorphous silicon.

11. The optical device of claim 10, wherein the nanostructures have a cylindrical shape or a square shape.

12. The optical device of claim 9, wherein the plurality of nanostructures further comprise a plurality of second nanostructures configured to collimate the second target spectrum of the external light on the second sensing region of the sensor, the plurality of second nanostructures comprising the at least one second nanostructure.

13. The optical device of claim 12, wherein the first and second nanostructures are arranged at one surface of the substrate, or are arranged on opposite surfaces of the substrate from each other.

14. An optical device comprising:
a substrate;
a first nanostructure on the substrate, and configured to collimate a first target spectrum of external light on a first sensing region of a sensor, the first target spectrum corresponding to a thermal imaging region of an infrared (IR) spectrum; and
a second nanostructure on the substrate, and configured to collimate a second target spectrum of the external light on a second sensing region of the sensor, the second target spectrum being different from the first target spectrum,
wherein the first and second nanostructures have different geometric sizes from each other,
wherein the first nanostructure comprises at least two adjacent first nanostructures that are spaced apart from each other and comprising a material to transmit the first target spectrum of the external light through, and wherein the second nanostructure comprises a material to transmit the second target spectrum of the external light through, and is located between and spaced apart from the at least two adjacent first nanostructures in a plan view, wherein the first target spectrum is in a range between 8 μm and 12 μm, and the second target spectrum is in a range between 0.4 μm and 2.5 μm, wherein the substrate includes a first multisector region and a second multisector region that do not overlap with each other in the plan view, and wherein the first nanostructure is arranged at the first multisector region, and the second nanostructure is arranged at the second multisector region.

15. The optical device of claim 14, wherein the first nanostructure has a larger diameter or height than the second nanostructure.

* * * * *